(12) United States Patent
Ragini et al.

(10) Patent No.: US 7,579,092 B2
(45) Date of Patent: Aug. 25, 2009

(54) CYCLOMETALATED TRANSITION METAL COMPLEX AND ORGANIC ELECTROLUMINESCENT DEVICE USING THE SAME

(75) Inventors: Das Rupasree Ragini, Suwon-si (KR); Seok Chang, Daejeon-si (KR); Yi-Yeol Lyu, Yongin-si (KR); Eun-Sil Han, Gyeonggi-do (KR); Young-Hun Byun, Yongin-si (KR); Lyong-Sun Pu, Suwon-si (KR); Jong-Hyoup Lee, Seoul (KR)

(73) Assignee: Samsung Mobile Display Co., Ltd., Yongin, Gyunggi-Do (KR)

( * ) Notice: Subject to any disclaimer, the term of this patent is extended or adjusted under 35 U.S.C. 154(b) by 701 days.

(21) Appl. No.: 11/081,541

(22) Filed: Mar. 17, 2005

(65) Prior Publication Data

US 2006/0046095 A1 Mar. 2, 2006

(30) Foreign Application Priority Data

Aug. 28, 2004 (KR) ................ 10-2004-0068290

(51) Int. Cl.
*H01L 51/54* (2006.01)
*C09K 11/06* (2006.01)
(52) U.S. Cl. ............... 428/690; 428/917; 313/504; 257/E51.044; 546/4; 546/10; 548/103; 548/108
(58) Field of Classification Search ............... None
See application file for complete search history.

(56) References Cited

U.S. PATENT DOCUMENTS

| 6,946,688 B2 * | 9/2005 | Grushin et al. ........... 257/98 |
| 7,129,518 B2 * | 10/2006 | Grushin et al. ........... 257/40 |
| 2002/0048689 A1 | 4/2002 | Igarashi et al. .......... 428/690 |
| 2002/0064681 A1 | 5/2002 | Takiguchi et al. ........ 428/690 |
| 2002/0182441 A1 | 12/2002 | Lamansky et al. ........ 428/690 |
| 2002/0190250 A1 * | 12/2002 | Grushin et al. ........... 257/40 |

FOREIGN PATENT DOCUMENTS

WO WO 02/15645 A1 2/2002

OTHER PUBLICATIONS

Dedeian et al., "Blue Phosphorescence from Mixed Cyano-Isocyanide Cyclometalated Iridium (III) Complexes", Inorganic Chemistry, vol. 46, No. 5, 2007, pp. 1603-1611 (published on Web Dec. 24, 2006).*

* cited by examiner

*Primary Examiner*—Marie R. Yamnitzky
(74) *Attorney, Agent, or Firm*—Robert E. Bushnell, Esq.

(57) ABSTRACT

A high-efficient phosphorescent cyclometalated transition metal complex represented by the formula M(C^N)( C^N)' (CN-R)X, and an organic electroluminescent (EL) device using the same. The transition metal complex can be used in formation of an organic layer of the organic EL device and produce white light emission when used together with a green-emitting material and a red-emitting material as well as emission at the wavelength range of 400-650 nm.

18 Claims, 5 Drawing Sheets

CYCLOMETALATED TRANSITION METAL COMPLEX AND ORGANIC ELECTROLUMINESCENT DEVICE USING THE SAME

CLAIM OF PRIORITY

This application claims priority from Korean Patent Application No. 10-2004-0068290, filed on Aug. 28, 2004, in the Korean Intellectual Property Office, the disclosure of which is incorporated herein in its entirety by reference.

BACKGROUND OF THE INVENTION

1. Field of the Invention

The present invention relates to a cyclometalated transition metal complex and an organic electroluminescent device using the same. More particularly, the present invention relates to a cyclometalated transition metal complex that can emit light ranging from a blue region to a red region from a triplet metal-to-ligand charge-transfer (MLCT) state and to an organic electroluminescent device using the cyclometalated transition metal complex as an emitting organic layer material.

2. Description of the Related Art

Organic electroluminescent (EL) devices are self-emission displays that emit light by recombination of electrons and holes in a thin layer (hereinafter, referred to as "organic layer") made of a fluorescent or phosphorescent organic compound when a current is applied to the organic layer. The organic EL devices have advantages such as lightweight, simple constitutional elements, an easy fabrication process, high image quality, and a wide viewing angle. Furthermore, high color purity and perfect creation of dynamic images are ensured. In addition, the organic EL devices have electrical properties suitable for portable electronic equipment such as low power consumption and low driving voltage.

A common organic EL device has a sequentially stacked structure of an anode, a hole transport layer, a light emission layer, an electron transport layer, and a cathode, on an upper surface of a substrate. The hole transport layer, the light emission layer, and the electron transport layer are organic layers made of organic compounds. The organic EL device with the above-described structural feature is driven as follows. When a voltage is applied to the anode and the cathode, holes from the anode are transferred to the light emission layer via the hole transport layer. On the other hand, electrons from the cathode are transferred to the light emission layer via the electron transport layer. Carriers recombine at the light emission layer to generate excitons. By the radiative decay of the excitons, light emission occurs at the wavelength corresponding to the bandgap of a material.

A material for the light emission layer in the organic EL device is divided into a fluorescent material using a singlet exciton and a phosphorescent material using a triplet exciton according to emission mechanism. The light emission layer is formed of the fluorescent or phosphorescent material alone or an appropriate host material doped with the fluorescent or phosphorescent material. Singlet excitons and triplet excitons are formed in the host during electronic excitation. At this time, a statistical ratio of the singlet excitons to the triplet excitons is 1 to 3.

An organic EL device including a light emission layer made of a fluorescent material has a disadvantage in that triplet excitons formed in a host are wasted. On the other hand, an organic EL device including a light emission layer made of a phosphorescent material has an advantage of 100% internal quantum efficiency since both singlet excitons and triplet excitons can be utilized. In this respect, a light emission layer made of a phosphorescent material can achieve significantly high emission efficiency, relative to a light emission layer made of a fluorescent material.

When a heavy metal such as Ir, Pt, Rh, and Pd is introduced into an organic molecule, the heavy atom effect leads to spin-orbital coupling, whereby a triplet state and a singlet state are mixed. Therefore, a forbidden transition is induced, which allows efficient phosphorescent emission even at room temperature.

Recently, there have been developed high-efficiency, green and red phosphorescent materials with 100% internal quantum efficiency.

As high-efficiency phosphorescent materials, there have been reported various materials based on transition metal compounds containing transition metal such as Osmium, iridium and platinum. To date, green and red phosphorescent materials satisfying characteristics necessary for high-efficiency full-color displays or low power consumption and white light emission applications have been reported. However, efficient and reliable blue phosphorescent materials have not been developed, which is a significant obstruction to development of phosphorescent full-color devices.

In view of this problem, a blue-emitting material has been developed (WO 02/15645 A1, US 2002/0064681 A1 entitled Luminescence device, display apparatus and metal coordination compound to Takiguchi et al., and published on May 3, 2002). Furthermore, there has been developed an organometallic complex having a bulky functional group capable of increasing a HOMO-LUMO difference by a molecular geometrical change or a functional group (e.g., cyano group) with high ligand field strength. In addition, there have been developed an iridium complex represented by formula Ir(ppy)$_2$P (ph)$_3$Y (Y=Cl or CN) (US2002/0182441 A1 entitled Organometallic compounds and emission-shifting organic electrophosphorescence to Lamansky et al., and published on Dec. 5, 2002) and an iridium (III) complex having a cyclometalated ligand, a chelating diphosphine, chlorine, and cyano group (US 2002/0048689 A1 entitled Light-emitting device and iridium complex to Igarashi et al., and published on Apr. 25, 2002).

SUMMARY OF THE INVENTION

It is therefore an object of the present invention to provide an improved material for an organic electroluminescent device and an improved organic electroluminescent device.

It is still an object of the present invention to provide a cyclometalated transition metal complex that can efficiently emit light ranging from a blue region to a red region in a triplet metal-to-ligand charge-transfer (MLCT) state.

It is further an object of the present invention to provide an organic electroluminescent (EL) device that can efficiently emit light ranging from a blue region to a red region.

According to an aspect of the present invention, there is provided a cyclometalated transition metal complex represented by the following formula 1:

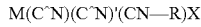   [Formula 1]

wherein M is a transition metal selected from Ru, Rh, Ir, Os, Pt, and Au;

each of (C^N) and (C^N)' is a cyclometalated ligand;

R is aryl, aryloxy, aryloxycarbonyl, heteroaryl, arylthio, aralkyl, heteroaralkyl, or aralkenyl; and X is one selected from the group consisting of Cl, OCN, CN, SCN, P(Ph)$_2$, R'COOH, R'CONH, R'NH, pyrazole, substituted or unsubstituted alkyl, substituted or unsubstituted alkoxy, or substituted or unsubstituted aryloxy, NR'H, NR'$_2$, OH, SH, and a sulfonic acid group, wherein R' is an alkyl group of 1-10 carbon atoms, a cycloalkyl group of 5-14 carbon atoms, or an aryl group of 5-14 carbon atoms.

According to another aspect of the present invention, there is provided an organic EL device including an organic layer between a pair of electrodes, wherein the organic layer includes the cyclometalated transition metal complex of the above formula 1.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1A:
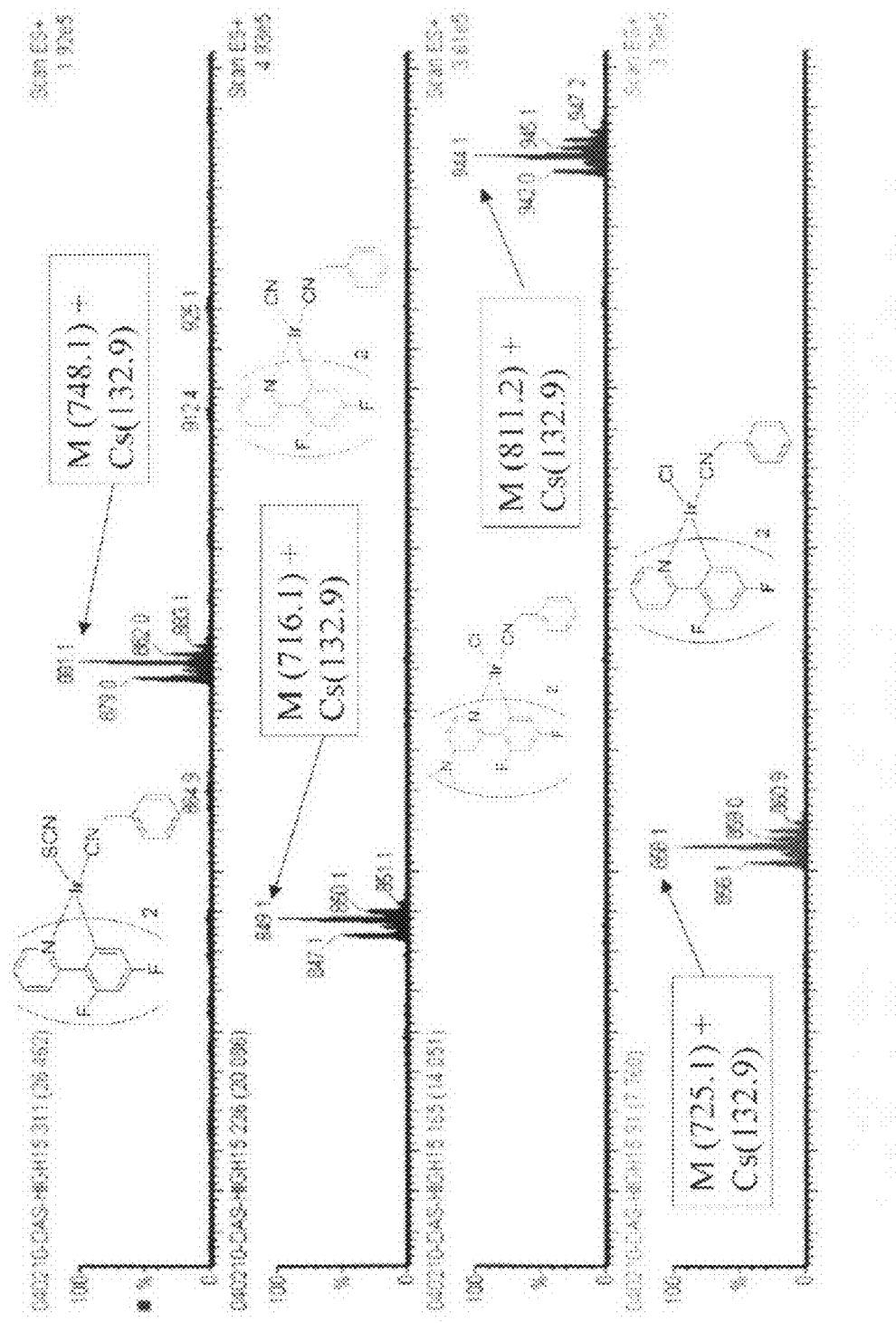
FIG. 1A is a mass spectrum (1A) of compounds of Examples of the present invention.

Hereinafter, the present invention will be described in more detail.

A cyclometalated transition metal complex according to the present invention can exhibit an increase in the energy gap between the highest occupied molecular orbital (HOMO) and the triplet metal-to-ligand charge-transfer (MLCT) states by the incorporation of an aromatic isocyanide ligand, thus enabling blue light emission.

A cyclometalated transition metal complex of the present invention is represented by the following formula 1:

M(C^N)(C^N)'(CN—R)X [Formula 1]

wherein M is a transition metal such as Ru, Rh, Ir, Os, Pt, and Au;

each of (C^N) and (C^N)' is a cyclometalated ligand;

R is aryl, heteroaryl, aryloxy, aryloxycarbonyl, arylthio, aralkyl, aralkenyl, or heteroaralkyl; and X is Cl, OCN, CN, SCN, P(Ph)$_2$, R'COO, R'CONH, R'NH, pyrazole, substituted or unsubstituted alkyl, substituted or unsubstituted alkoxy, or substituted or unsubstituted aryloxy, NR'H, NR'$_2$, OH, SH, or a sulfonic acid group, wherein R' is an alkyl group of 1-10 carbon atoms, a cycloalkyl group of 5-14 carbon atoms, or an aryl group of 5-14 carbon atoms.

The cyclometalated transition metal complex of the present invention has aromatic isocyanide as a non-monoanionic monodentate, carbon coordinated ligand, which enables efficient emission of blue light.

In the formula 1, R may be an aryl group preferably of 6-30 carbon atoms, more preferably 6-20 carbon atoms, and still more preferably 6-12 carbon atoms, an aryloxy group preferably of 6-30 carbon atoms, more preferably 6-20 carbon atoms, and still more preferably 6-12 carbon atoms, an aryloxycarbonyl group preferably of 7-30 carbon atoms, more preferably 7-20 carbon atoms, and still more preferably 7-12 carbon atoms, a heteroaryl group preferably of 4-30 carbon atoms, more preferably 4-20 carbon atoms, and still more preferably 4-11 carbon atoms, an arylthio group preferably of 4-30 carbon atoms, more preferably 4-20 carbon atoms, and still more preferably 5-11 carbon atoms, an aralkyl group preferably of 6-30 carbon atoms, more preferably 6-20 carbon atoms, and still more preferably 7-13 carbon atoms, a heteroaralkyl group preferably of 6-30 carbon atoms, more preferably 6-20 carbon atoms, and still more preferably 6-12 carbon atoms, and an aralkenyl group preferably of 7-30 carbon atoms, more preferably 7-20 carbon atoms, and still more preferably 7-14 carbon atoms.

In the formula 1, the two cyclometalated ligands, (C^N) and (C^N)', may be the same or different, and each may be one selected from the group consisting of the compounds represented by the following formulae:

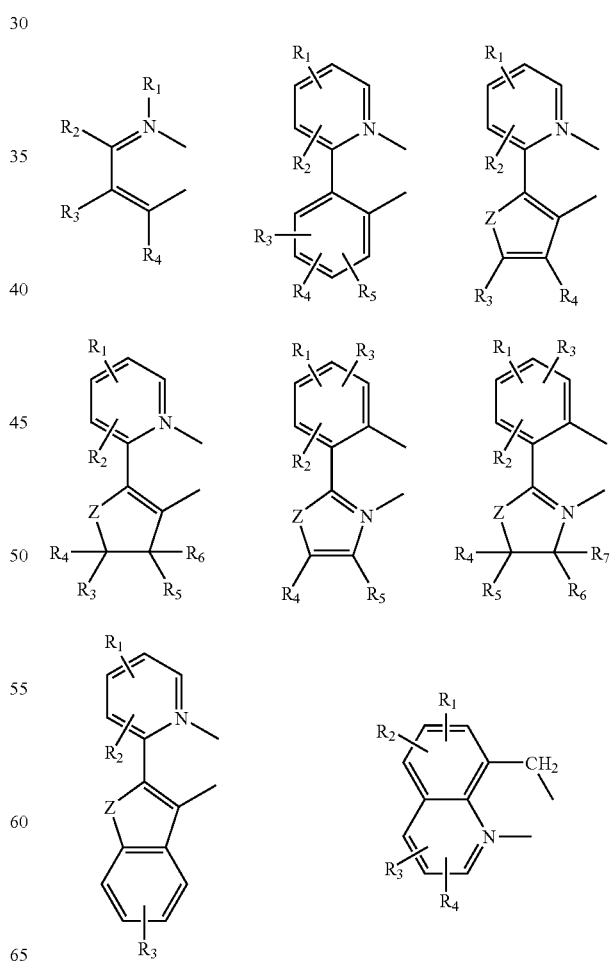

-continued

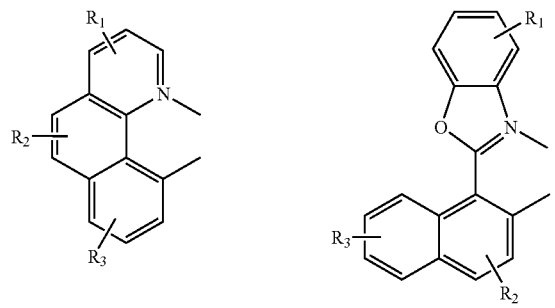
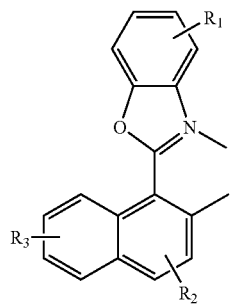
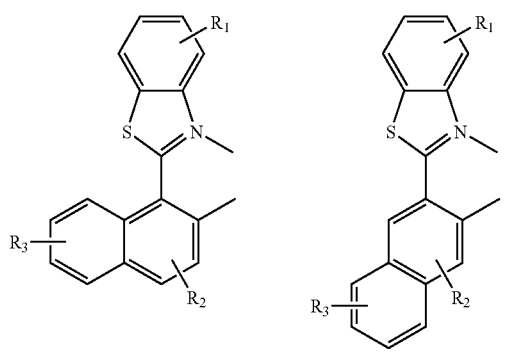
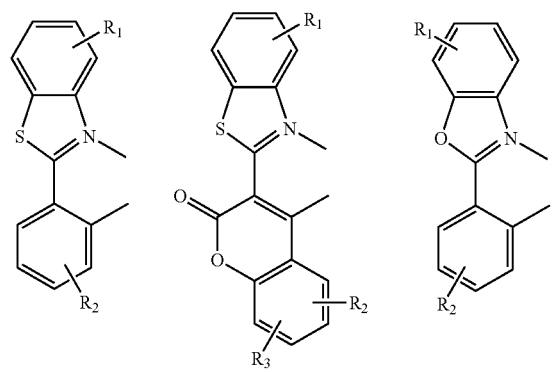
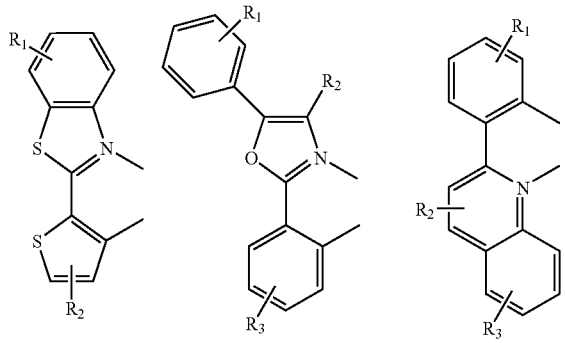
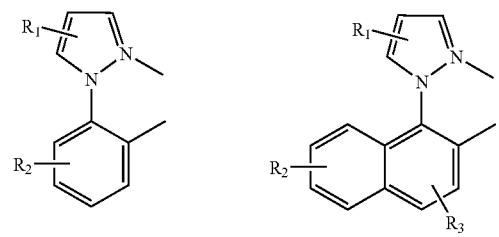

-continued

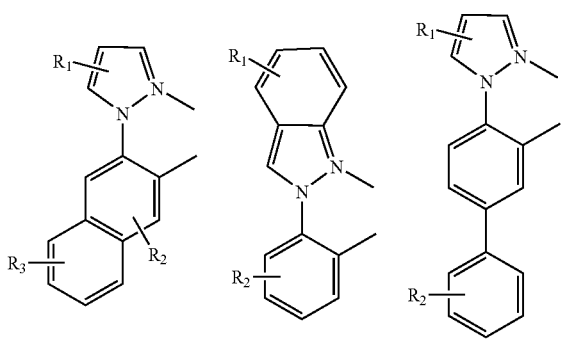
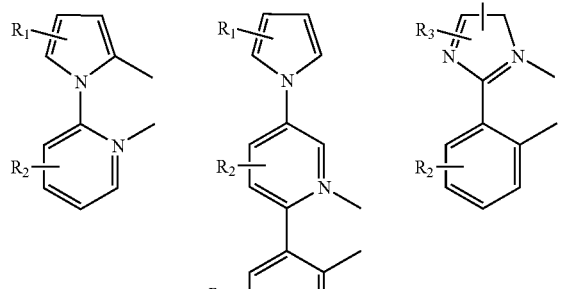
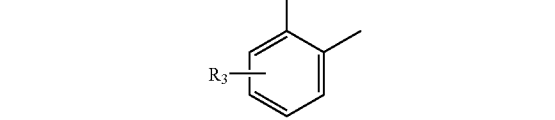

wherein Z is S, O, or NR$_1$;

R$_1$, R$_2$, R$_3$, R$_4$, R$_5$, and R$_6$ are each independently one selected from the group consisting of hydrogen, halogen, CN, alkyl, aryl, amino, alkoxy, aryloxy, heterocyclyloxy, acyl, alkoxycarbonyl, aryloxycarbonyl, acyloxy, acylamino, alkoxycarbonylamino, aryloxycarbonylamino, sulfonylamino, sulfamoyl, carbamoyl, alkylthio, arylthio, heterocyclylthio, sulfonyl, sulfinyl, ureido, phosphoramide, sulfino, hydrazino, imino, heterocyclyl, silyl, silyloxy, hydroxamine, nitro, hydroxyl, mercapto, sulfo, carboxyl, and nitro. At least two of R$_1$, R$_2$, R$_3$, R$_4$, R$_5$, and R$_6$ can be bonded to each other.

The cyclometalated transition metal complex of the formula 1 includes exemplary compounds represented by the following formulae, but is not limited thereto:

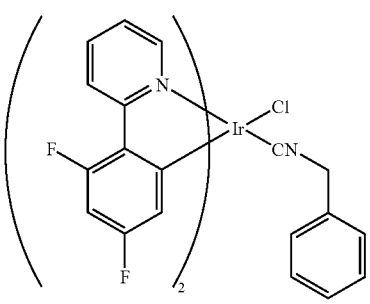

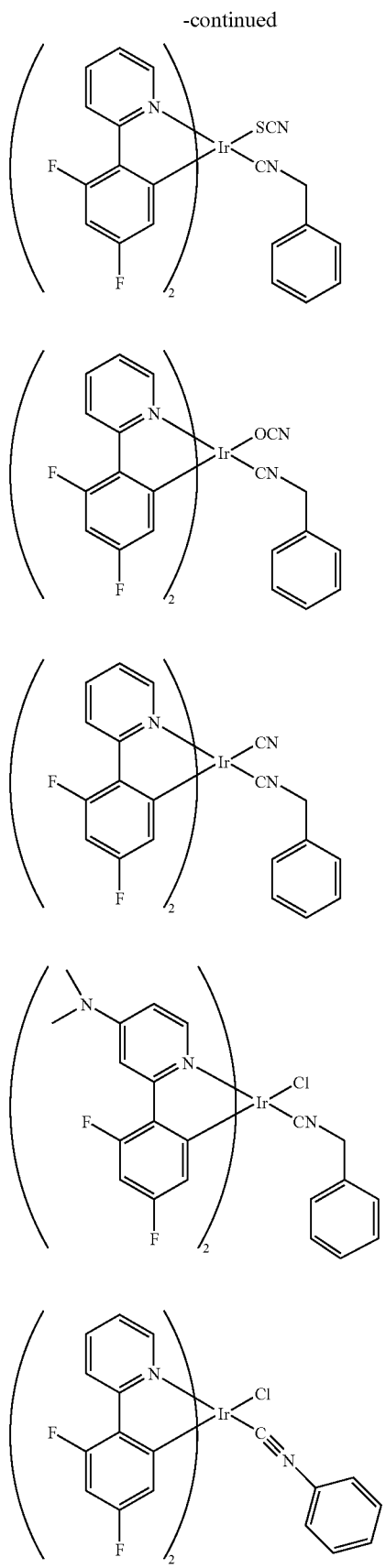
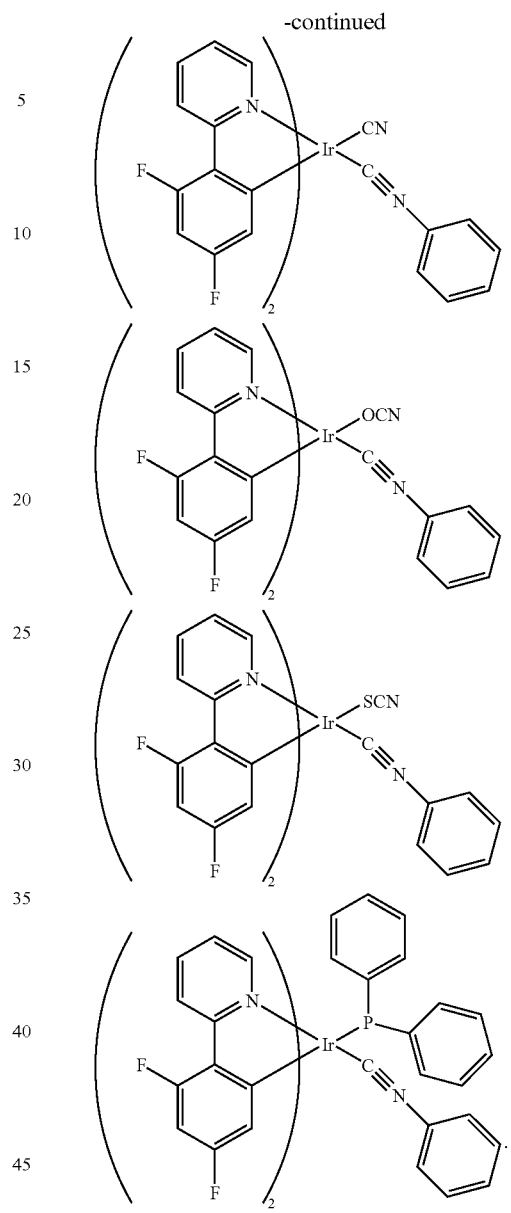

A cyclometalated transition metal complex according to the present invention has emission characteristics at the wavelength range of 400 to 650 nm.

A cyclometalated transition metal complex according to the present invention can be synthesized by the method reported by Watts group [F. O.Garces, R. J.Walts, Inorg.Chem. 1988, (35), 2450] using a [Ir(C^N)$_2$Cl]$_2$ derivative which is a starting material serving as a cyclometalated moiety donor.

Hereinafter, synthetic pathways of cyclometalated transition metal complexes according to the preferred embodiments of the present invention will be described.

Referring to the following reaction scheme 1, a [Ir(C^N)$_2$(RNC)Cl] compound can be synthesized by mixing a [Ir(C^N)$_2$Cl]$_2$ derivative and an aromatic isocyanide compound as starting materials with a solvent such as 1,2-dichloromethane, methylenechloride, and tetrahydrofuran (THF), followed by stirring at room temperature for 2-48 hours.

Reaction of the [Ir(C^N)₂(RNC)Cl] compound with an anion X can produce a [Ir(C^N)₂(RNC)X] compound.

[Reaction Scheme 1]

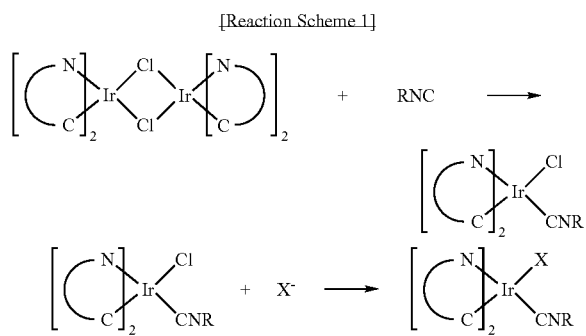

wherein R is as defined in the above formula 1 and X is as defined in the above formula 1 except Cl.

An organic EL device of the present invention is manufactured by forming an organic layer, in particular a light emission layer, using a cyclometalated transition metal complex of the present invention. At this time, the transition metal complex of the above formula 1 is very useful as a phosphorescent dopant which is a light emission layer material and exhibits excellent emission characteristics at a blue wavelength region.

When a cyclometalated transition metal complex according to the present invention is used as a phosphorescent dopant, the organic layer may further include one or more selected from the group consisting of at least one polymeric host, a mixture of a polymeric host and a low molecular host, a low molecular host, and a non-emission polymeric matrix. There are no limitations on the polymeric host, the low molecular host, and the non-emission polymeric matrix, provided that they are those as used commonly in formation of light emission layers for organic EL devices. Examples of the polymeric host include polyvinylcarbazole (PVK) and polyfluorene, examples of the low molecular host include CBP (4,4'-N,N'-dicarbazole-biphenyl), 4,4'-bis[9-(3,6-biphenylcarbazolyl)]-1,1'-biphenyl, 9,10-bis[(2',7'-t-butyl)-9',9'''-spirobifluorenylanthracene, and tetrafluorene, and examples of the non-emission polymeric matrix include polymethylmethacrylate, polycarbonate and polystyrene, but are not limited thereto.

Preferably, a cyclometalated transition metal complex according to the present invention is used in an amount of 1 to 30 parts by weight, based on the total weight (100 parts by weight) of a light emission layer material. The cyclometalated transition metal complex can be incorporated in the light emission layer by vacuum deposition, sputtering, printing, coating, ink-jet, or e-beam.

A cyclometalated transition metal complex according to the present invention can produce white light emission when used together with a green-emitting material and a red-emitting material.

Preferably, the thickness of the organic layer ranges from 30 to 100 nm. As used herein, the organic layer is a layer made of an organic compound interposed between a pair of electrodes in the organic EL device, for example an electron transport layer and a hole transport layer, in addition to a light emission layer. Such an organic EL device can have such a structure as anode/light emission layer/cathode, anode/buffer layer/light emission layer/cathode, anode/hole transport layer/light emission layer/cathode, anode/buffer layer/hole transport layer/light emission layer/cathode, anode/buffer layer/hole transport layer/light emission layer/electron transport layer/cathode, or anode/buffer layer/hole transport layer/light emission layer/hole blocking layer/cathode, as commonly known in the art, but is not limited thereto.

The buffer layer may be made of a material commonly used in the art, preferably, copper phthalocyanine, polythiophene, polyaniline, polyacetylene, polypyrrole, polyphenylenevinylene, or a derivative thereof, but is not limited thereto.

The hole transport layer may be made of a material commonly used in the art, preferably polytriphenylamine, but is not limited thereto.

The electron transport layer may be made of a material commonly used in the art, preferably polyoxadiazole, but is not limited thereto.

The hole blocking layer may be made of a material commonly used in the art, preferably LiF, BaF₂, or MgF₂, but is not limited thereto.

An organic EL device according to the present invention can be manufactured by a common organic EL device manufacturing method using a common light-emitting material without requiring a particular apparatus.

A cyclometalated transition metal complex according to the present invention can produce light emission at the wavelength range of 400 to 650 nm. A light emission diode using such a cyclometalated transition metal complex can be used in optical illumination sources for full-color displays, backlighting, exterior bulletin boards, optical communication, interior decoration, and the like.

Hereinafter, the present invention will be described more specifically by Examples. However, the following Examples are provided only for illustrations and thus the present invention is not limited to or by them.

REFERENCE EXAMPLE 1

Synthesis of F₂ppy Dimer

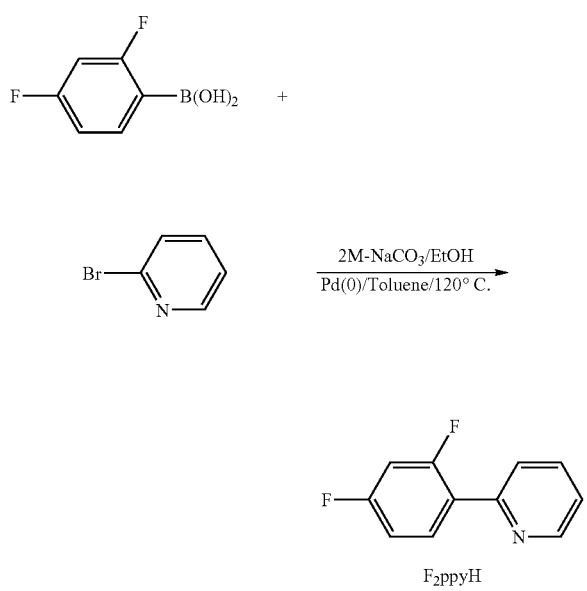

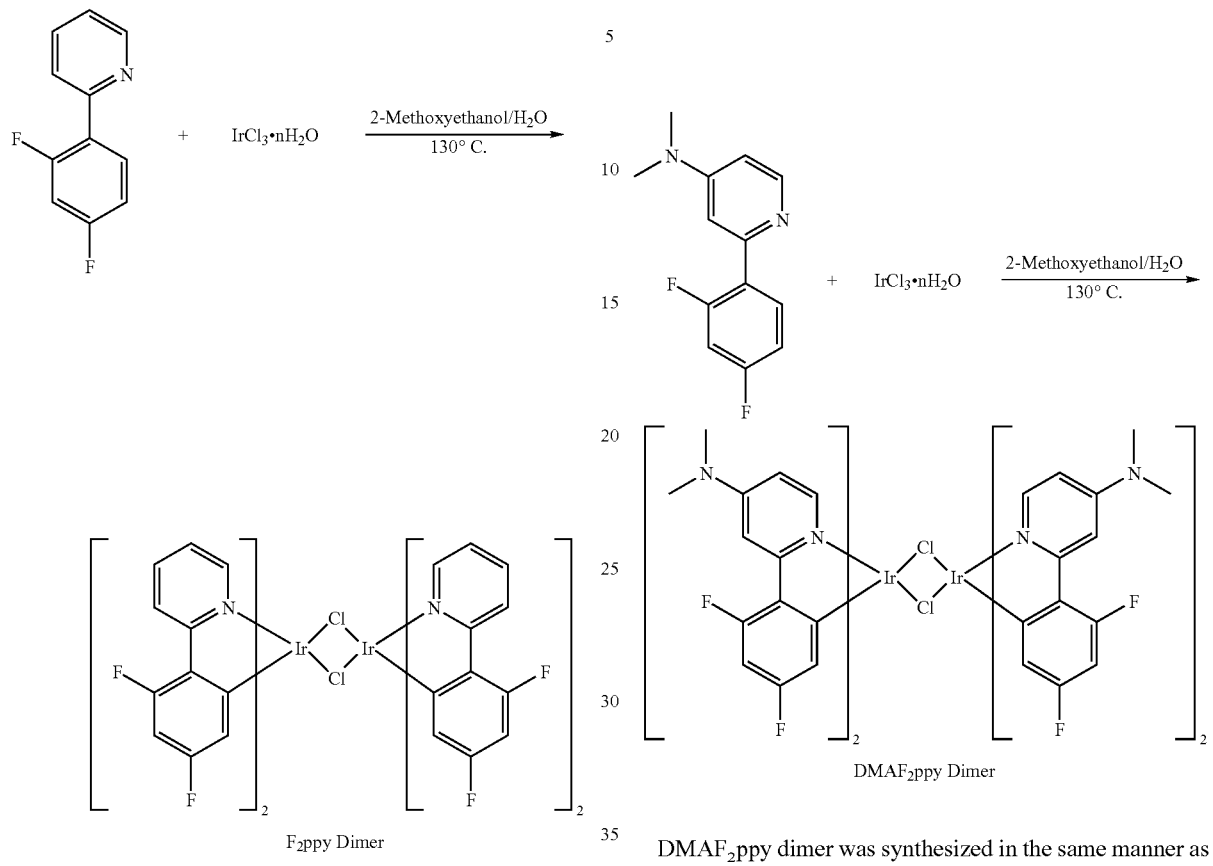

F₂ppy Dimer 19.85 g (1.25×10⁴ mmol) of 2-bromopyridine, 25.00 g (1.58×10⁴ mmol) of 2,4-2,4-difluorophenylboronic acid, 100 mL of toluene, 48 mL of ethanol, and a 2M sodium carbonate solution prepared from 95 mL of water were added to a 500 mL side-armed flask and stirred at room temperature under a nitrogen atmosphere. Then, 4.53 g (3.92 mmol) of tetrakis (triphenylphosphine) palladium (0) was added to the reaction mixture and refluxed for 15 hours in the dark under a nitrogen atmosphere.

After the reaction terminated, the reaction solution was set to room temperature followed by extraction with ethylacetate and water and then separation by column chromatography (toluene:hexane=10:1) to obtain a light brown liquid (F₂ppyH).

$^1$H-NMR(CD$_2$Cl$_2$,ppm): 8.69(d, 1H), 8.03(m, 1H), 7.70 (m, 2H), 7.27(m, 1H), 7.00(m, 2H)

F₂ppy dimer of a yellow powder was synthesized from the 2-(4,6-difluorophenylpyridine) monomer synthesized according to the above procedure and IrCl₃·nH2O. A synthesis method is disclosed in J. Am. Chem. Soc., 1984, 106, 6647-6653, which is incorporated herein by reference.

$^1$H-NMR(CD$_2$Cl$_2$,ppm): 9.1(d, 4H), 8.3(d, 4H), 7.9(t, 4H), 6.9(m, 4H), 6.5(m, 4H), 5.3(d, 4H)

REFERENCE EXAMPLE 2

Synthesis of DMA F₂ppy Dimer

DMAF₂ppy Dimer

DMAF₂ppy dimer was synthesized in the same manner as in Reference Example 1 except that 25.26 g (1.25×10⁴ mmol) of 2-bromo-4-dimethylaminopyridine was used instead of 2-bromopyridine.

$^1$H-NMR(CD$_2$Cl$_2$,ppm): 8.7(d, 4H), 7.5(t, 4H), 6.3(m, 4H), 6.1(m, 4H) 5.4(d, 4H), 3.2(s, 24H)

Hereinafter, methods of preparing cyclometalated transition metal compounds with aromatic isocyanide ligands according to the present invention and light emission materials with alkyl isocyanide ligands according to a conventional technique have been disclosed.

Compounds synthesized in the following examples were identified by 1H NMR, mass spectrum and thermogravimetric analyses (TGA), and the emission characteristics were analyzed by photoluminescent (PL) and electroluminescent (EL) spectra.

The emission characteristics of the compounds of the following Examples were evaluated by the following methods.

A first method is to evaluate the emission characteristics of 10-4 M methylenechloride solution prepared by dissolving each compound in methylenechloride. A second method is to evaluate the emission characteristics of a film formed by dissolving 94 parts by weight of polymethylmethacrylate (PMMA) and 6 parts by weight of each compound in a solvent followed by spin-coating.

EL devices used in the evaluation of the emission characteristics were multilayer EL devices which had the following structure and an emission area of 9 mm2:

substrate/first electrode/hole injection layer/hole transport layer/light emission layer/hole blocking layer/electron transport layer/electron injection layer/second electrode= glass/ITO/PEDOT (40 nm)/NBP(15 nm)/PS(24%)+mCP(70%)+Dopant(6%)(40 nm)/BAlQ(10 nm)/L iF(1 nm)/Al(200 nm).

EXAMPLE 1

SYNTHESIS OF IRIDIUM (III) BIS (2-(4',6'-DIF-LUOROPHENYL)PYRIDINATO-CHLORO-BENZYLISOCYANIDE [Ir(F$_2$ppy)$_2$(bnzNC)(Cl)]

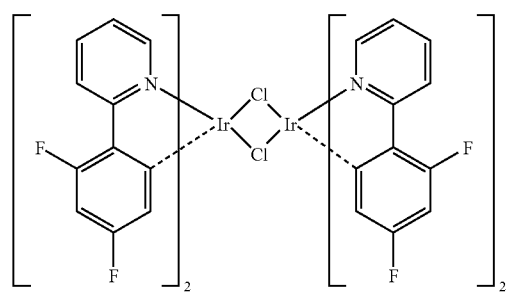

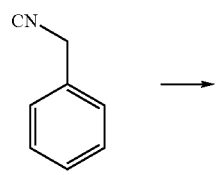

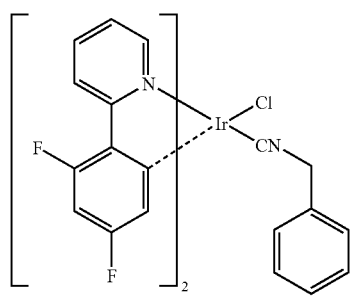

1 g (0.82 mmol) of the [(F$_2$ppy)$_2$IrCl]$_2$ synthesized in Reference Example 1 and 0.24 g (2.05 mmol) of benzylisocyanide were dissolved in 30 ml of THF in a 100 ml two-neck flask equipped with a thermometer, a mechanical stirrer, and a reflux condenser under a nitrogen atmosphere, and stirred at room temperature for 24 hours. After the reaction terminated, the reaction solution was purified by column chromatography on silica gel using methanol/dichloromethane/hexane as eluent followed by recrystallization with chloroform/hexane. After a solvent was removed by filtration, the resultant product was sufficiently dried at 30° C. in a vacuum oven to give 0.93 g (yield 75%) of the title compound as a pure light yellow solid.

EXAMPLE 2

SYNTHESIS OF IRIDIUM (III) BIS(2-(4',6'-DIFLUOROPHENYL)PYRIDINATO-CYANO-BENZYLISOCYANIDE [Ir(F$_2$ppy)$_2$(bnzNC(CN))]

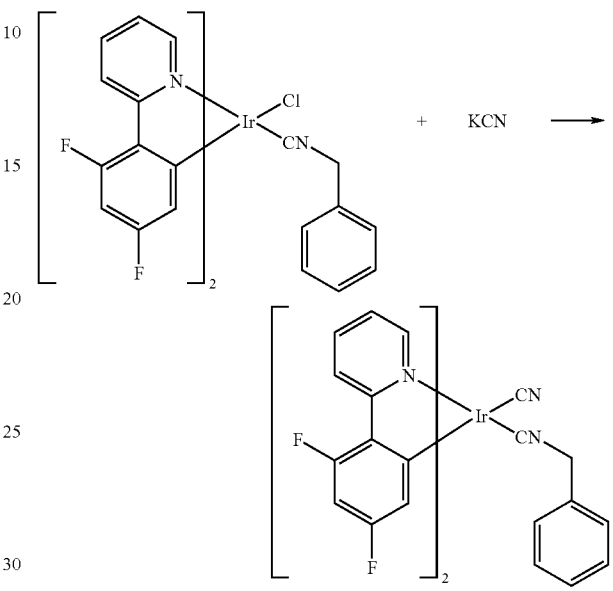

0.163 g (2.5 mmol) of potassium cyanide was added to 0.365 g (0.5 mmol) of the iridium (III) bis(2-(4',6'-difluorophenyl)pyridinato-chloro-benzylisocyanide synthesized in Example 1, placed in a mixed solvent of 10 ml dichloromethane and 15 ml methanol, and stirred at room temperature for 24 hours. After the reaction terminated, the reaction solution was purified by column chromatography on silica gel using methanol/dichloromethane/hexane as eluent followed by recrystallization with chloroform/hexane. After the solvent was removed by filtration, the resultant product was dried to give 0.28 g (yield 75%) of the title compound as a white solid.

EXAMPLE 3

SYNTHESIS OF IRIDIUM (III) Bis(2-(4',6'-DIFLUOROPHENYL)PYRIDINATO-THIOCYANO-BENZYLISOCYANIDE [Ir(F$_2$ppy)$_2$(bnzNC)(SCN)]

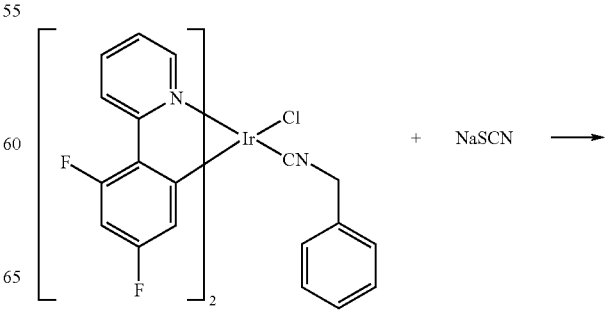

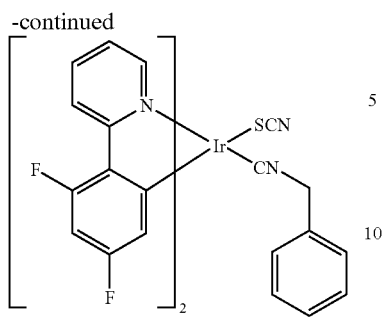

0.203 g (2.5 mmol) of sodium thiocyanate was added to 0.365 g (0.5 mmol) of the iridium (III) bis(2-(4',6'-difluorophenyl)pyridinato-chloro-benzylisocyanide synthesized in Example 1, placed in a mixed solvent of 10 ml dichloromethane and 15 ml methanol, and stirred at room temperature for 24 hours. After the reaction terminated, the reaction solution was purified by column chromatography on silica gel using methanol/dichloromethane/hexane as eluent followed by recrystallization with chloroform/hexane. After the solvent was removed by filtration, the resultant product was dried to give 0.279 g (yield 70%) of the title compound as a yellow solid.

EXAMPLE 4

SYNTHESIS OF IRIDIUM (III) BIS(2-(4',6'-DIFLUOROPHENYL)PYRIDINATO-OXYCYANO-BENZYLISOCYANIDE [Ir(F$_2$ppy)$_2$(bnzNC)(OCN)]

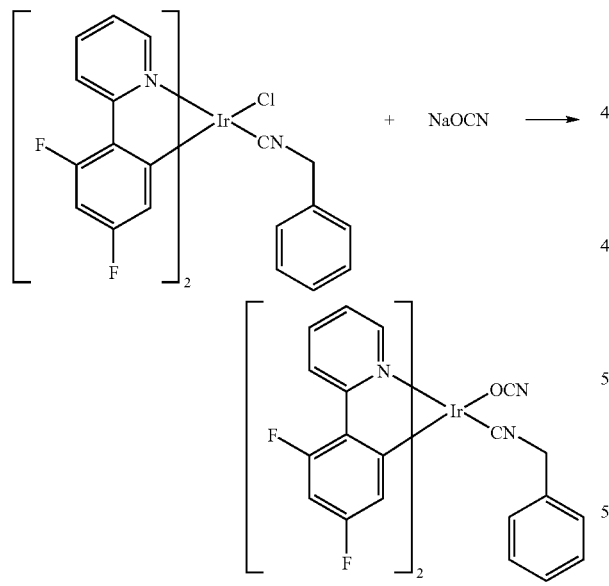

0.163 g (2.5 mmol) of sodium oxycyanate was added to 0.365 g (0.5 mmol) of the iridium (III) bis(2-(4',6'-difluorophenyl)pyridinato-chloro-benzylisocyanide synthesized in Example 1, placed in a mixed solvent of 10 ml dichloromethane and 15 ml methanol, and stirred at room temperature for 24 hours. After the reaction terminated, the reaction solution was purified by column chromatography on silica gel using methanol/dichloromethane/hexane as eluent followed by recrystallization with chloroform/hexane. After the solvent was removed by filtration, the resultant product was dried to give 0.27 g (yield 70%) of the title compound as a light yellow solid.

EXAMPLE 5

SYNTHESIS OF IRIDIUM (III) BIS(2-(DIMETHYLAMINO-4',6'-DIFLUOROPHENYL)PYRIDINATO-CHLORO-BENZYLISOCYANIDE [Ir(DMAF$_2$ppy)$_2$(bnzNC)(Cl)]

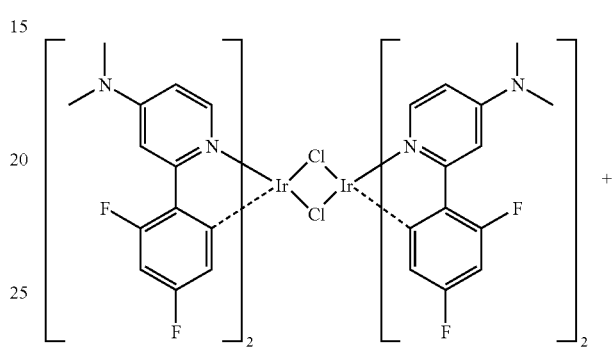

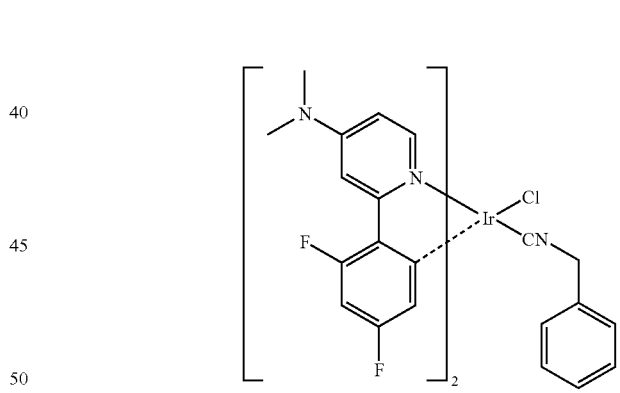

1.15 g (0.82 mmol) of the [(DMA F$_2$ppy)$_2$IrCl]$_2$ synthesized in Reference Example 2 and 0.24 g (2.05 mmol) of benzylisocyanide were dissolved in 30 ml of THF in a 100 ml two-neck flask equipped with a thermometer, a mechanical stirrer, and a reflux condenser under a nitrogen atmosphere, and stirred at room temperature for 24 hours. After the reaction terminated, the reaction solution was purified by column chromatography on silica gel using methanol/dichloromethane/hexane as eluent followed by recrystallization with chloroform/hexane. After the solvent was removed by filtration, the resultant product was sufficiently dried in a 30° C. vacuum oven to give 0.99 g (yield 75%) of the title compound as a pure light yellow solid.

EXAMPLE 6

SYNTHESIS OF IRIDIUM (III) BIS(2-(4',6'-DIFLUOROPHENYL)PYRIDINATO-CHLORO-PHENYLISOCYANIDE [Ir(F$_2$ppy)$_2$(phNC)(Cl)]

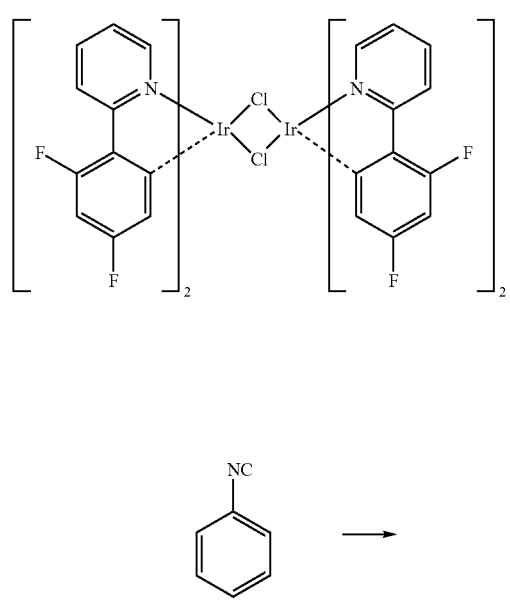

1 g (0.82 mmol) of the [(F$_2$ppy)$_2$IrCl]$_2$ synthesized in Reference Example 1 and 0.21 g (2.05 mmol) of phenylisocyanide were dissolved in 30 ml of THF in a 100 ml two-neck flask equipped with a thermometer, a mechanical stirrer, and a reflux condenser under a nitrogen atmosphere, and stirred at room temperature for 24 hours. After the reaction terminated, the reaction solution was purified by column chromatography on silica gel using methanol/dichloromethane/hexane as eluent followed by recrystallization with chloroform/hexane. After the solvent was removed by filtration, the resultant product was sufficiently dried in a 30° C. vacuum oven to give 0.875 g (yield 75%) of the title compound as a pure light yellow solid.

EXAMPLE 7

SYNTHESIS OF IRIDIUM (III) BIS(2-(4',6'-DIFLUOROPHENYL)PYRIDINATO-CYANIDE-PHENYLISOCYANIDE [Ir(F$_2$ppy)$_2$(phNC)(CN)]

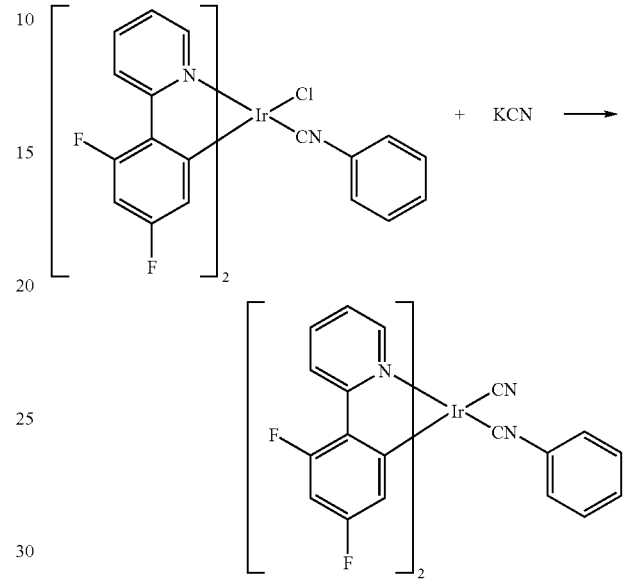

0.163 g (2.5 mmol) of potassium cyanide was added to 0.335 g (0.5 mmol) of the iridium (III) bis(2-(4',6'-difluorophenyl)pyridinato-chloro-phenylisocyanide synthesized in Example 6, placed in a mixed solvent of 10 ml dichloromethane and 5 ml methanol, and stirred at 50° C. for 4 hours. After the reaction terminated, the reaction solution was purified by column chromatography on silica gel using methanol/dichloromethane/hexane as eluent followed by recrystallization with chloroform/hexane. After the solvent was removed by filtration, the resultant product was dried to give 0.245 g (yield 70%) of the title compound as a light yellow solid.

EXAMPLE 8

SYNTHESIS OF IRIDIUM (III) BIS(2-(4',6'-DIFLUOROPHENYL)PYRIDINATO-OXYCYANIDE-PHENYLISOCYANIDE [Ir(F$_2$ppy)$_2$(phNC)(OCN)]

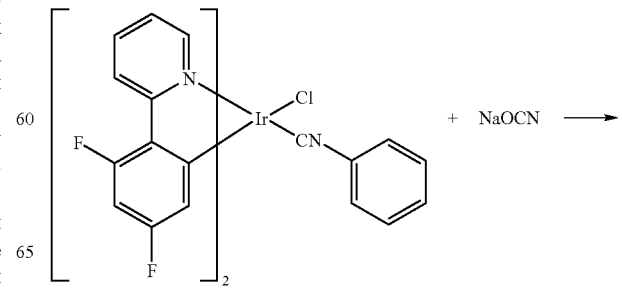

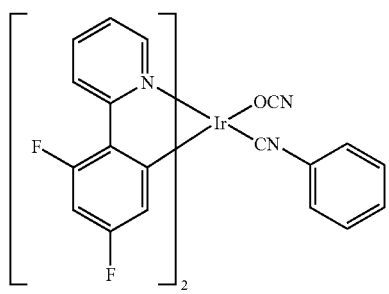

0.163 g (2.5 mmol) of sodium oxycyanate was added to 0.335 g (0.5 mmol) of the iridium (III) bis(2-(4',6'-difluorophenyl)pyridinato-chloro-phenylisocyanide synthesized in Example 6, placed in a mixed solvent of 10 ml dichloromethane and 15 ml methanol, and stirred at 50° C. for 2 hours. After the reaction terminated, the reaction solution was purified by column chromatography on silica gel using methanol/dichloromethane/hexane as an eluent followed by recrystallization with chloroform/hexane. After the solvent was removed by filtration, the resultant product was dried to give 0.265 g (yield 70%) of the title compound as a light yellow solid.

EXAMPLE 9

SYNTHESIS OF IRIDIUM (III) BIS(2-(4',6'-DIFLUOROPHENYL)PYRIDINATO-THIOCYANIDE-PHENYLISOCYANIDE [Ir(F$_2$ppy)$_2$(phNC)(SCN)]

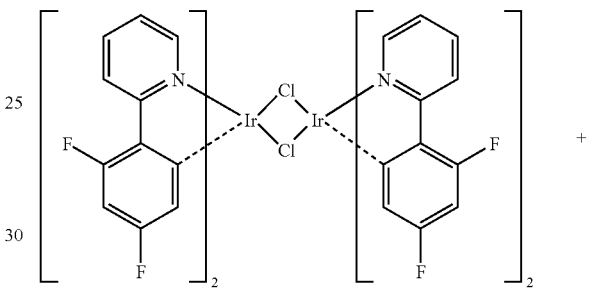

0.203 g (2.5 mmol) of sodium thiocyanide was added to 0.335 g (0.5 mmol) of the iridium (III) bis(2-(4',6'-difluorophenyl)pyridinato-chloro-phenylisocyanide synthesized in Example 6, placed in a mixed solvent of 10 ml dichloromethane and 15 ml methanol, and stirred at 50° C. for 2 hours. After the reaction terminated, the reaction solution was purified by column chromatography on silica gel using methanol/dichloromethane/hexane as eluent followed by recrystallization with chloroform/hexane. After the solvent was removed by filtration, the resultant product was dried to give 0.255 g (yield 70%) of the title compound as a light yellow solid.

COMPARATIVE EXAMPLE 1

SYNTHESIS OF IRIDIUM (III) BIS(2-(4',6'-DIFLUOROPHENYL)-PYRIDINATO-CHLORO-TERT-BUTYLISOCYANIDE [Ir(F$_2$ppy)$_2$(t-buNC)(Cl)]

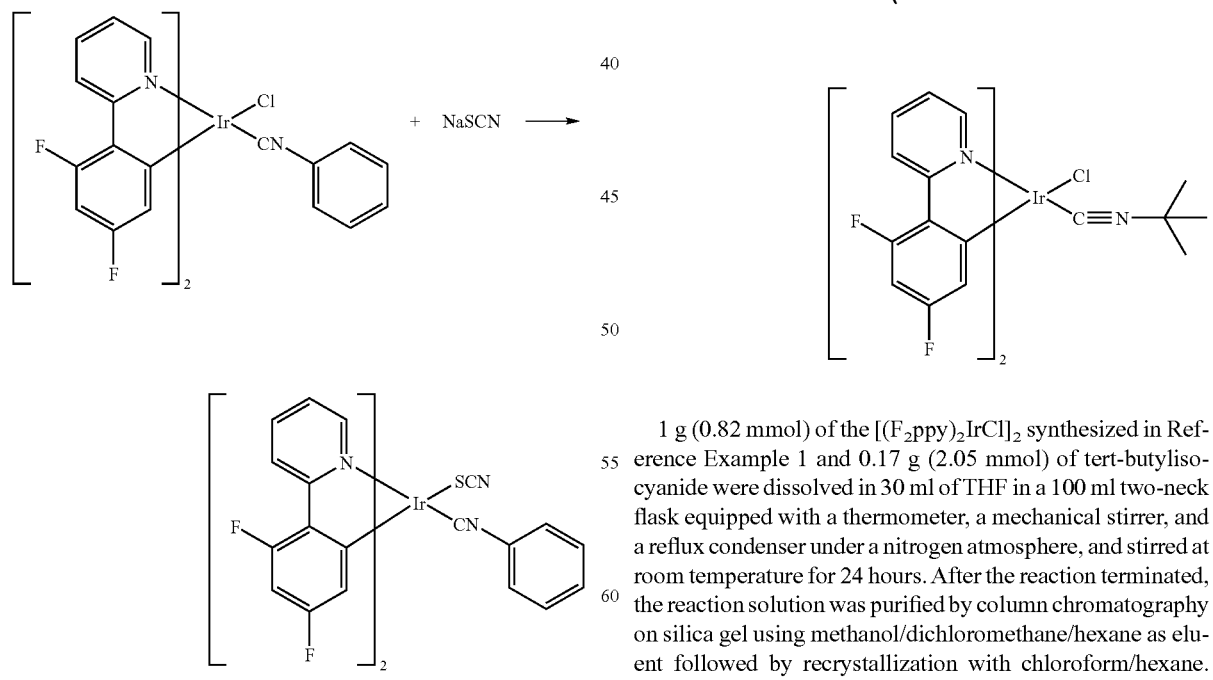

1 g (0.82 mmol) of the [(F$_2$ppy)$_2$IrCl]$_2$ synthesized in Reference Example 1 and 0.17 g (2.05 mmol) of tert-butylisocyanide were dissolved in 30 ml of THF in a 100 ml two-neck flask equipped with a thermometer, a mechanical stirrer, and a reflux condenser under a nitrogen atmosphere, and stirred at room temperature for 24 hours. After the reaction terminated, the reaction solution was purified by column chromatography on silica gel using methanol/dichloromethane/hexane as eluent followed by recrystallization with chloroform/hexane. After the solvent was removed by filtration, the resultant product was sufficiently dried in a 30° C. vacuum oven to give 0.76 g (yield 75%) of the title compound as a pure light yellow solid.

COMPARATIVE EXAMPLE 2

SYTHESIS OF IRIDIUM (III) BIS(2-(4',6'-DIFLUOROPHENYL)PYRIDINATO-CYANIDE-TERT-BUTYLISOCYANIDE [Ir(F₂ppy)₂(CN)(t-buNC)]

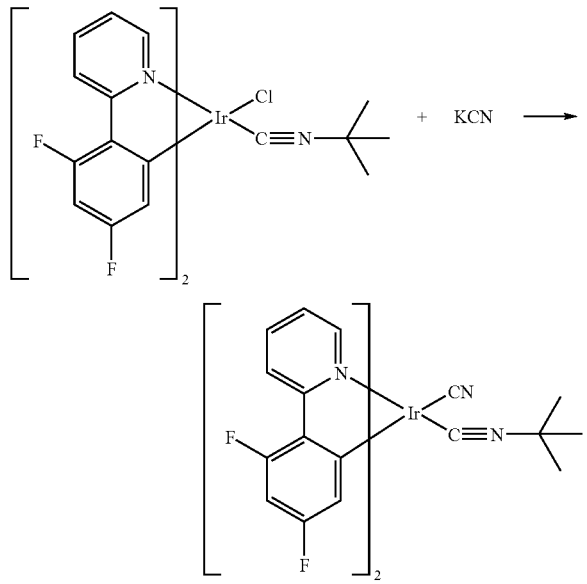

0.163 g (2.5 mmol) of potassium cyanide was added to 0.345 g (0.5 mmol) of the iridium (III) bis(2-(4',6'-difluorophenyl)pyridinato-chloro-tert-butylisocyanide synthesized in Comparative Example 1, placed in a mixed solvent of 10 ml dichloromethane and 15 ml methanol, and stirred at 50° C. for 2 hours. After the reaction terminated, the reaction solution was purified by column chromatography on silica gel using methanol/dichloromethane/hexane as eluent followed by recrystallization with chloroform/hexane. After the solvent was removed by filtration, the resultant product was dried to give 0.24 g (yield 70%) of the title compound as a beige solid.

The emission characteristics and CIE chromaticity coordinates of the compounds synthesized in Examples and Comparative Examples are summarized in Table 1 below.

TABLE 1

| $\lambda_{max}$(nm), Solution | Section | $\lambda_{max}$(nm), Film | Chromaticity coordinate |
|---|---|---|---|
| 452, 480 | Example 1 | 455, 479 | 0.14, 0.19 |
| 442, 472 | Example 2 | 442, 469 | 0.15, 0.15 |
| 450, 476 | Example 3 | 448, 475 | 0.14, 0.17 |
| 448, 478 | Example 4 | 452, 475 | 0.14, 0.16 |
| 451 | Example 5 | 453 | 0.14, 0.11 |
| 452, 479 | Example 6 | 452, 477 | 0.15, 0.18 |
| 442, 470 | Example 7 | 445, 470 | 0.15, 0.15 |
| 451, 479 | Example 8 | 452, 480 | 0.14, 0.17 |
| 448, 476 | Example 9 | 450, 475 | 0.14, 0.16 |
| 454, 482 | Comparative Example | 456, 482 | 0.14, 0.19 |
| 444, 473 | Comparative Example | 446, 475 | 0.14, 0.15 |

TABLE 2

| | $\lambda_{max}$ nm EL | CIE EL | $\eta_{ex}$ % |
|---|---|---|---|
| t-buNC (Comparative Example 2) | 490 | 0.22, 0.37 | 0.8 |
| BenzNC (Example 2) | 473 | 0.18, 0.28 | 1 |
| phNC (Example 7) | 477, 493 | 0.22, 0.36 | 1.11 |

As can be seen from Table 2, incorporation of aromatic isocyanide ligands exhibited an enhanced external EL quantum efficiency, relative to the incorporation of conventional alkyl cyanide ligands.

Figure 1B:
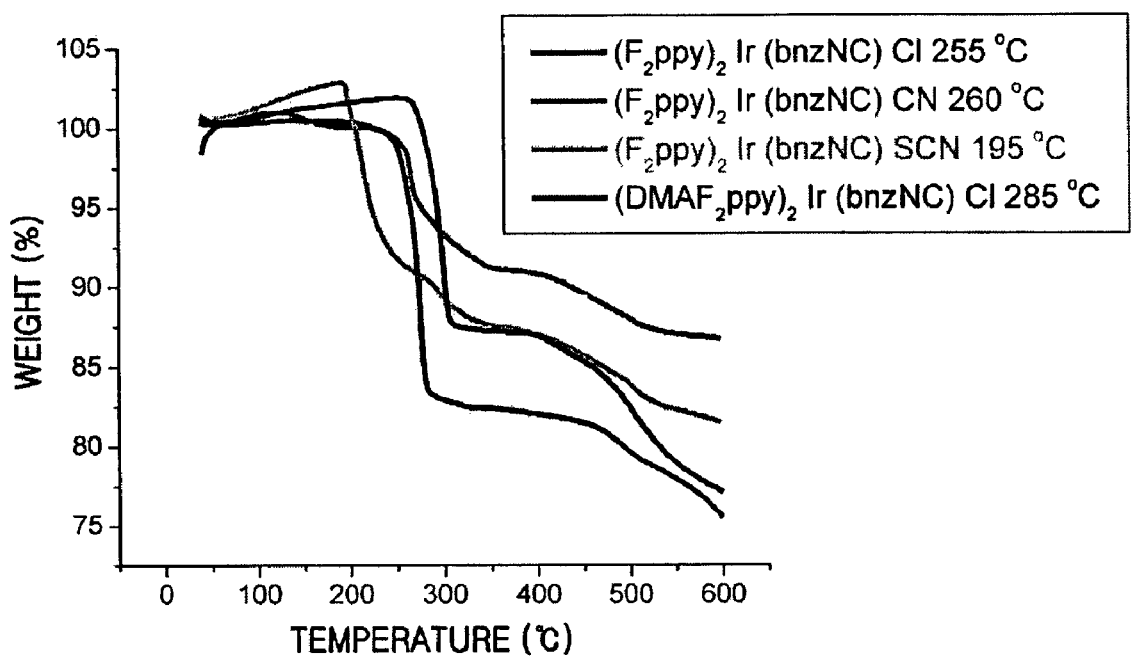
FIG. 1B is a thermogravimetric analysis (TGA) graph (1B) of compounds of Examples of the present invention.

FIG. 1 shows mass spectrum and TGA graph of the compounds of Examples 1, 2, 3, and 5.

Figure 2:
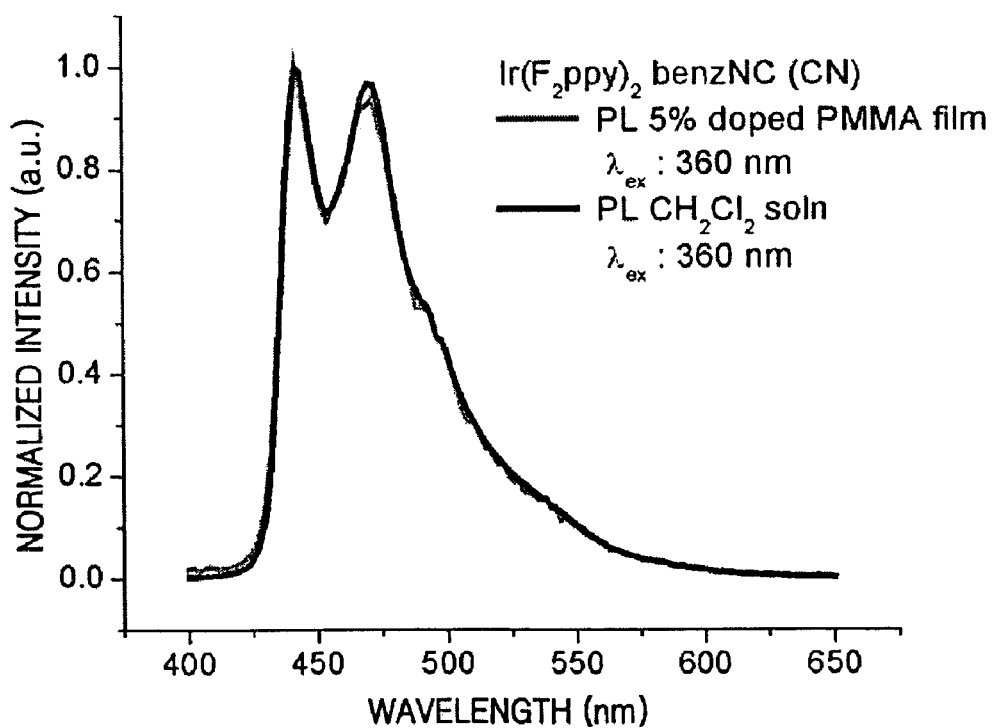
FIG. 2 is a photoluminescent (PL) spectrum of a compound of Example 2 of the present invention.
Figure 3:
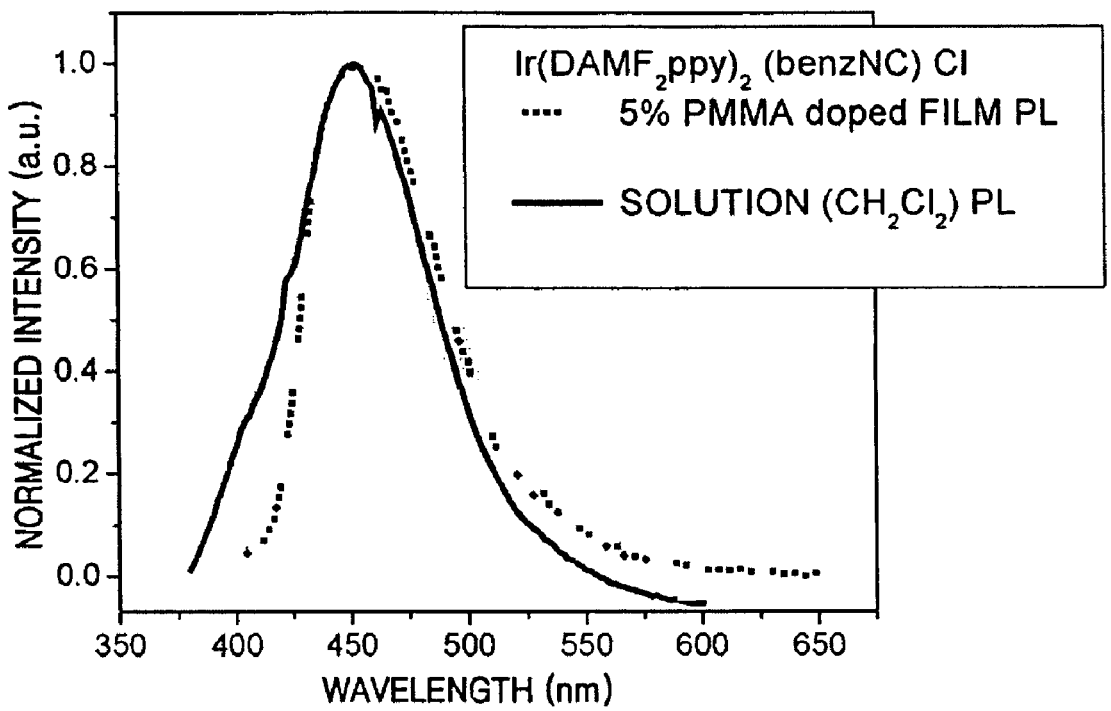
FIG. 3 is a PL spectrum of a compound of Example 5 of the present invention.
Figure 4A:
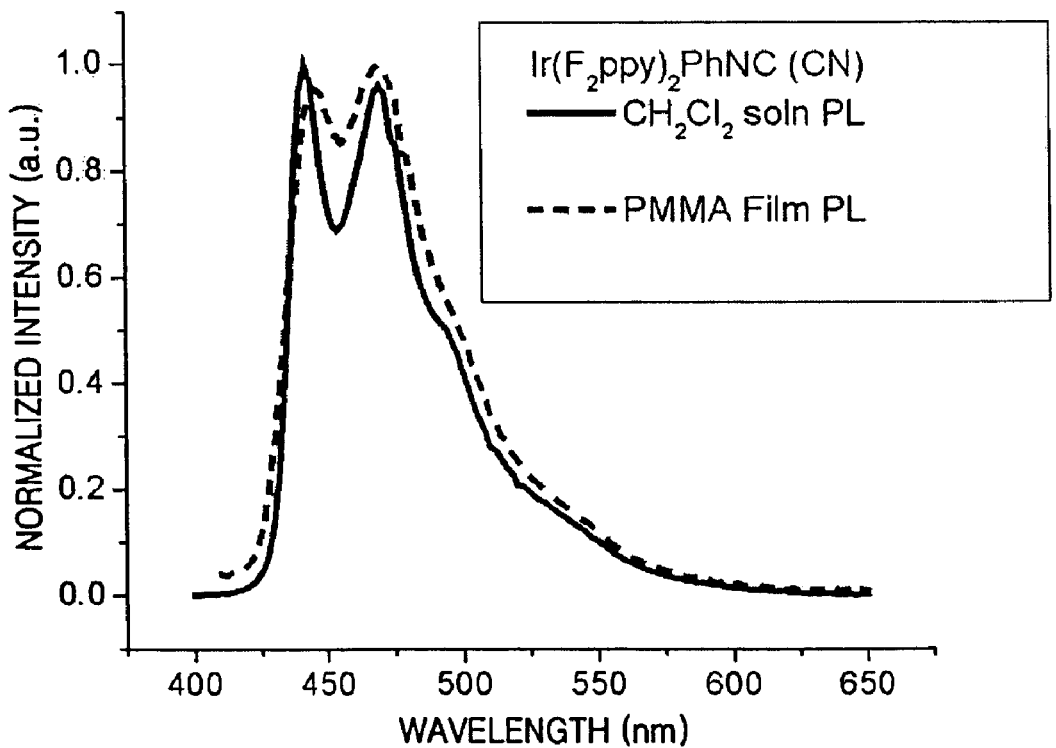
FIG. 4A is a PL spectrum of a compound of Example 7 of the present invention.
Figure 4B:
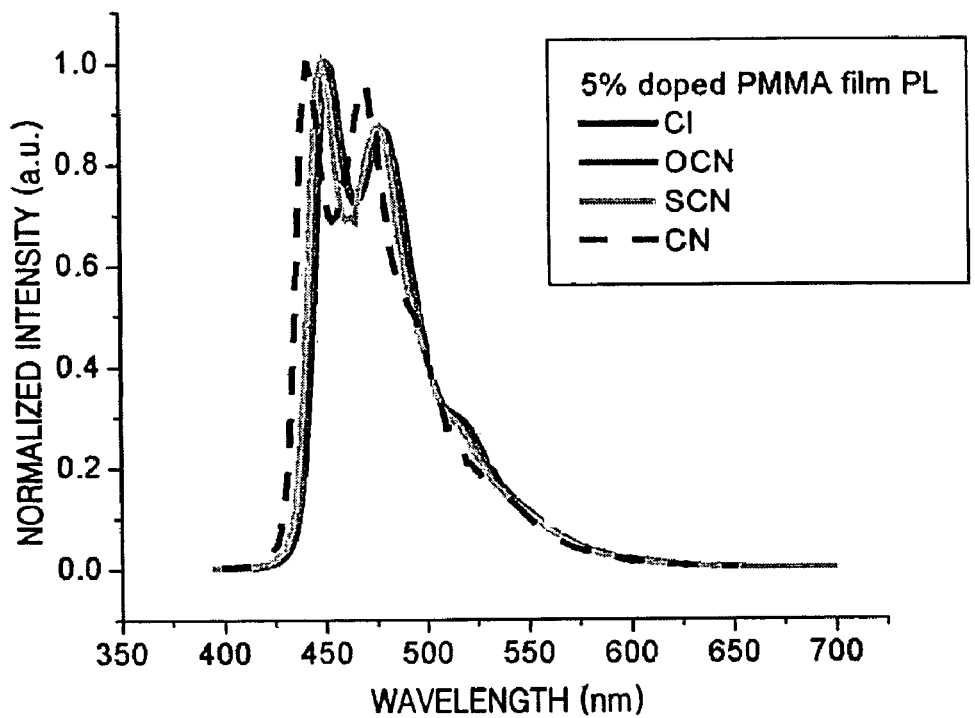
FIG. 4B is PL spectra of compounds of Examples 1 through 4 of the present invention.
Figure 5:
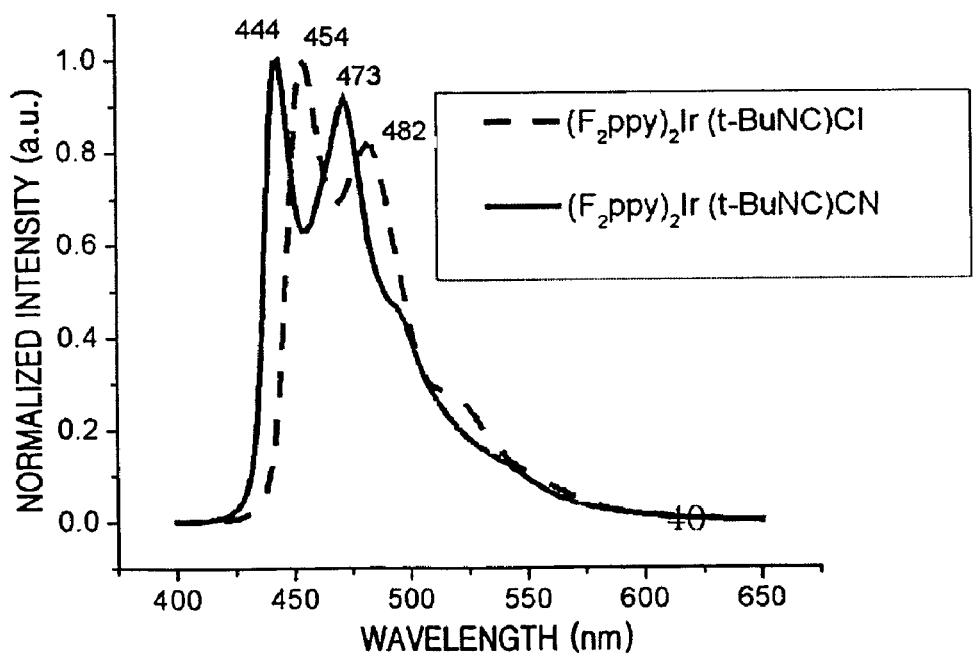
FIG. 5 is PL spectra of compounds of Comparative Examples.
Figure 6:
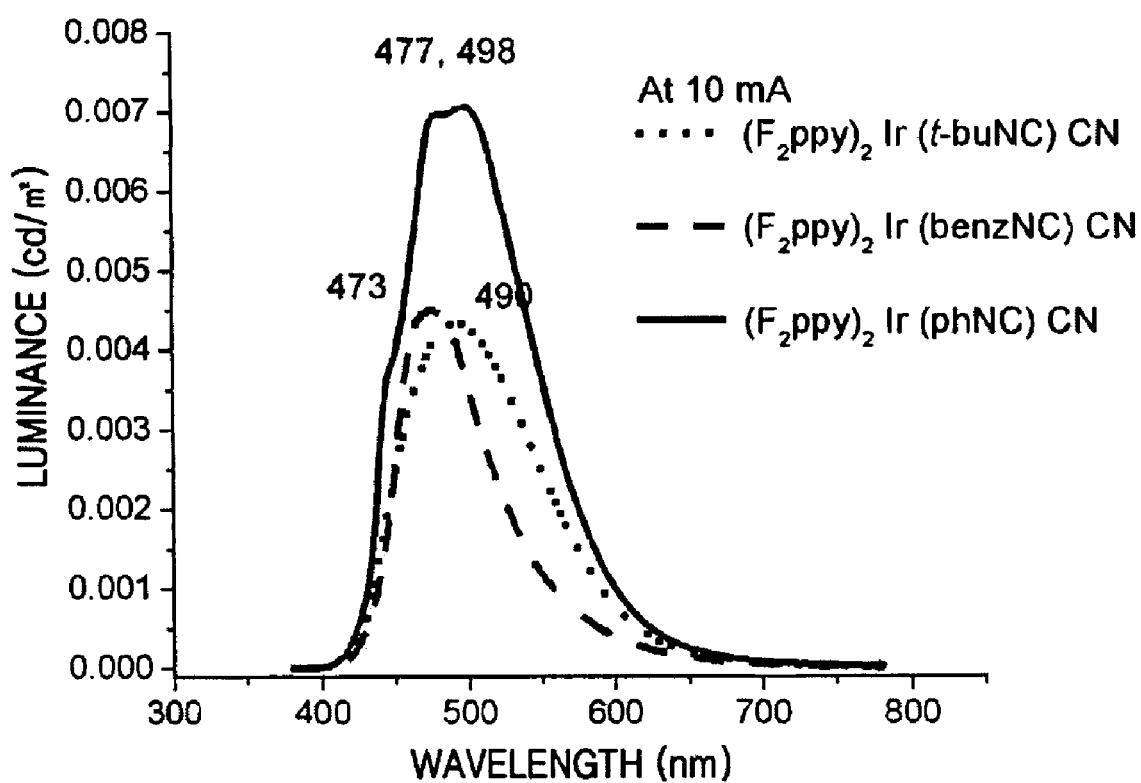
FIG. 6 is electroluminescent (EL) spectra of compounds of Examples 2 and 7 of the present invention and Comparative Example 2.

FIGS. 2, 3, and 4A are solution and film PL spectra of the compounds of Examples 2, 5, and 7, respectively, FIG. 4B are film PL spectra of the compounds of Examples 1, 2, 3, and 4, FIG. 5 is PL spectra of the compounds of Comparative Examples 1 and 2, and FIG. 6 is EL spectra of the compounds of Examples 2, 7, and Comparative Example 2.

As can be seen from Table 1 and the accompanying drawings, when aromatic isocyanide is used as an ancillary ligand, a dopant with excellent phosphorescent characteristics suitable as a blue phosphorescent material is obtained. Furthermore, incorporation of various main ligands enables realization of a full-color including red, green, and blue color.

A cyclometalated transition metal complex of the present invention has an aromatic isocyanide ligand, and thus, can efficiently emit light ranging from a blue region to a red region in a triplet MLCT state. Such a cyclometalated transition metal complex can be used in the formation of an organic layer of an organic EL device. Furthermore, since it can be used as a high-efficiency phosphorescent material, it can produce white light emission when used together with a green-emitting material and a red-emitting material as well as emission at the wavelength range of 400-650 nm.

What is claimed is:

1. A cyclometalated transition metal complex represented by Formula 1:

$$M(C^{\wedge}N)(C^{\wedge}N)'(CN-R)X \quad (1)$$

wherein M is a transition metal selected from the group consisting of Ru, Rh, Ir, Os, Pt, and Au;

each (C^N) and (C^N)' is a cyclometalated ligand;

R is aryl, aryloxy, aryloxycarbonyl, heteroaryl, arylthio, aralkyl, heteroaralkyl, or aralkenyl; and X is one selected from the group consisting of OCN, CN, SCN, P(Ph)₂, R'COO, R'CONH, R'NH, pyrazole, substituted alkyl, unsubstituted alkyl, substituted alkoxy, unsubstituted alkoxy, substituted aryloxy, unsubstituted aryloxy, NR'H, NR'₂, OH, SH, and a sulfonic acid group, wherein R' is an alkyl group of 1-10 carbon atoms, a cycloalkyl group of 5-14 carbon atoms, or an aryl group of 5-14 carbon atoms.

2. The cyclometalated transition metal complex of claim 1, wherein the two cyclometalated ligands represented by (C^N) and (C^N)' are the same or different, and each of (C^N) and (C^N)' is independently selected from the group consisting of compounds represented by the following formulae:

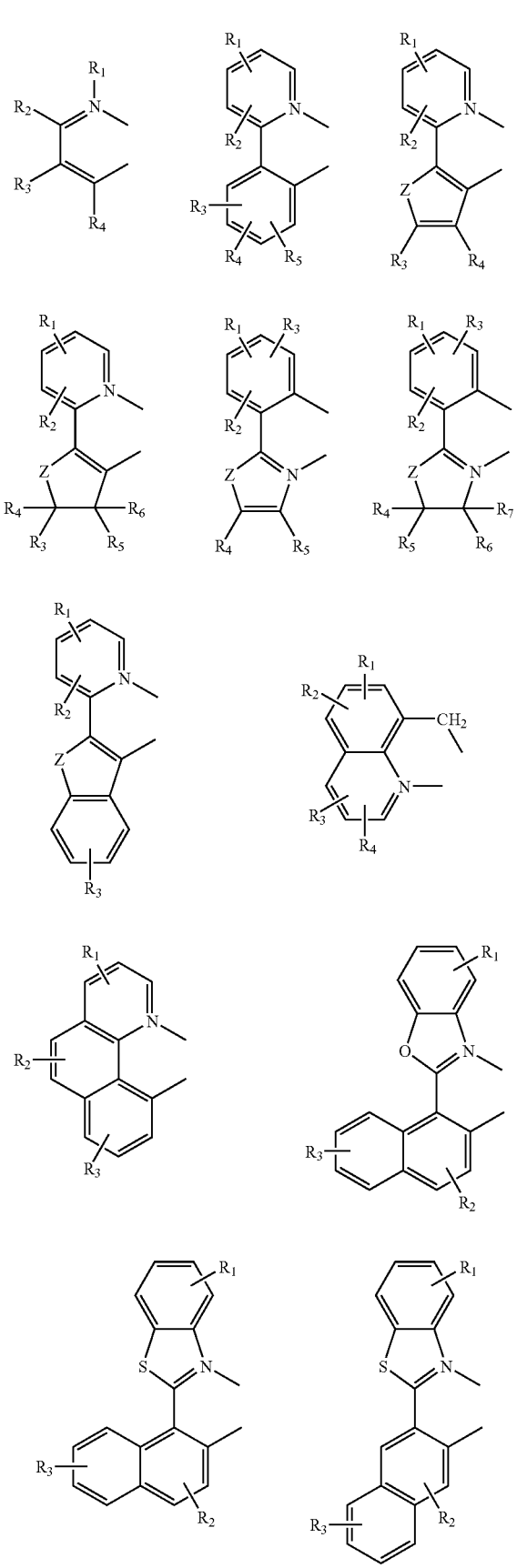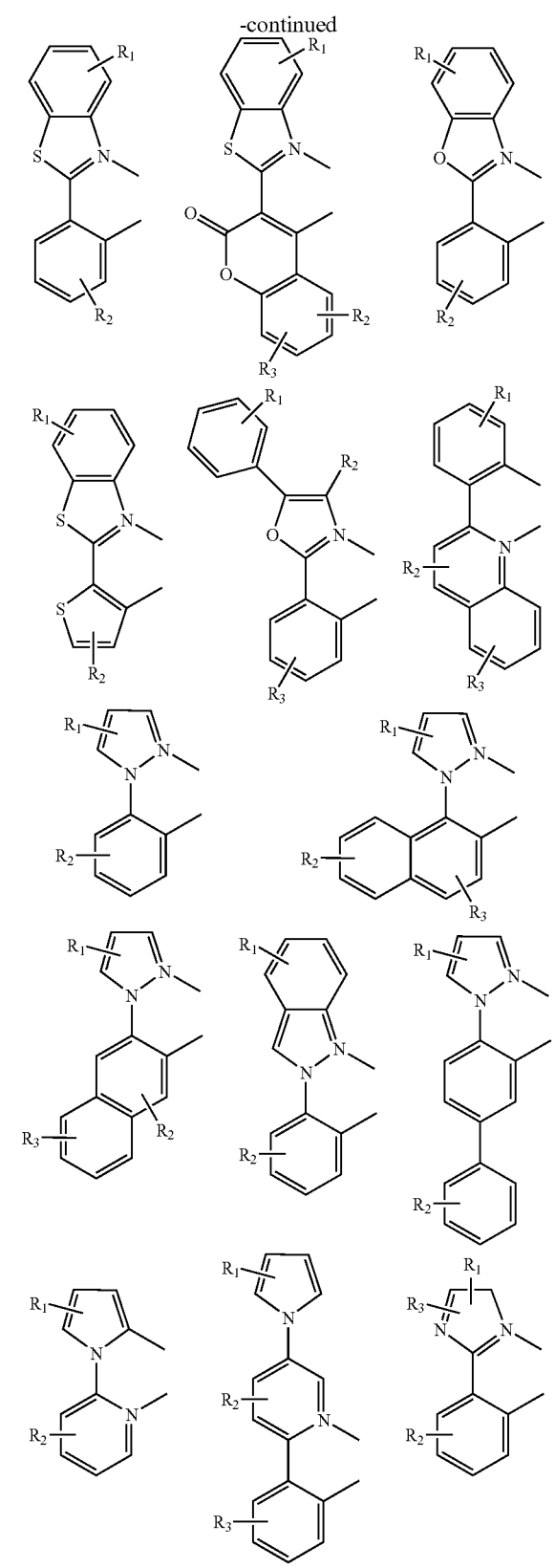
wherein Z is S, O, or NR$_1$;
$R_1$, $R_2$, $R_3$, $R_4$, $R_5$, and $R_6$ are each independently one selected from the group consisting of hydrogen, halogen, CN, alkyl, aryl, arylene, amino, alkoxy, aryloxy, heterocyclyloxy, acyl, alkoxycarbonyl, aryloxycarbonyl, acyloxy, acylamino, alkoxycarbonylamino, aryloxycarbonylamino, sulfonylamino, sulfamoyl, carbamoyl, alkylthio, arylthio, heterocyclylthio, sulfonyl, sulfinyl, ureido, phosphoramide, sulfino, hydrazino, imino, heterocyclyl, silyl, silyloxy, hydroxamine, nitro, hydroxyl, mercapto, sulfo, carboxyl, and nitro, and at least two of $R_1$, $R_2$, $R_3$, $R_4$, $R_5$, and $R_6$ can be bonded to each other.

3. The cyclometalated transition metal complex of claim 1, wherein M is Ir(III).

4. The cyclometalated transition metal complex of claim 1, wherein the cyclometalated transition metal complex has an emission wavelength range of 400 to 650 nm.

5. The cyclometalated transition metal complex of claim 1, wherein the cyclometalated transition metal complex is one selected from the group consisting of compounds represented by the following formulae:

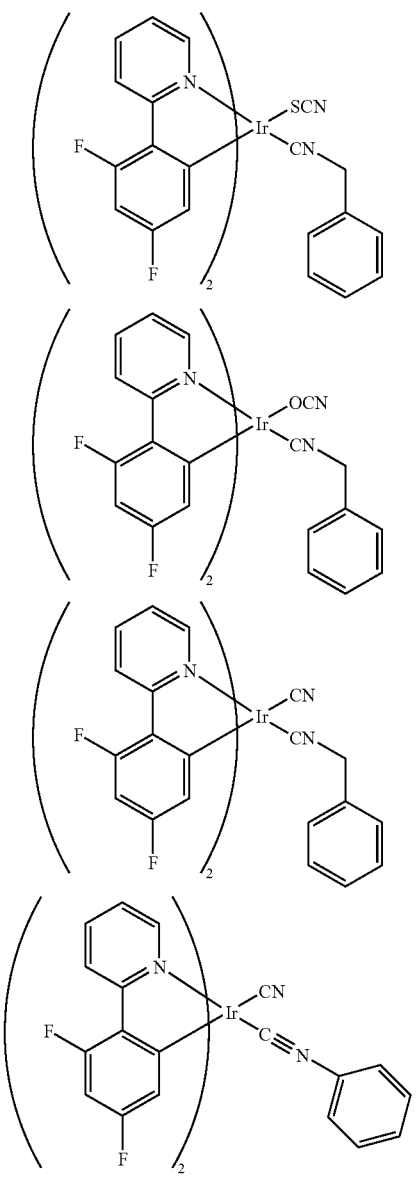

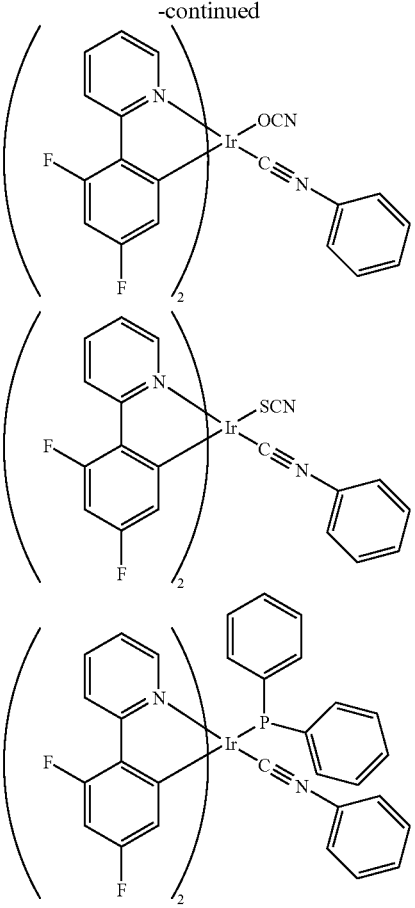

6. The cyclometalated transition metal complex of claim 2, wherein M is Ir(III).

7. The cyclometalated transition metal complex of claim 1, wherein R is selected from the group consisting of an aryl group of 6-30 carbon atoms, an aryloxy group of 6-30 carbon atoms, an aryloxycarbonyl group of 7-30 carbon atoms, a heteroaryl group of 4-30 carbon atoms, an arylthio group of 4-30 carbon atoms, an aralkyl group of 6-30 carbon atoms, a heteroaralkyl group of 6-30 carbon atoms, and an aralkenyl group of 7-30 carbon atoms.

8. An organic electroluminescent device, comprising:
   a pair of electrodes; and
   an organic layer between the pair of electrodes, the organic layer comprising a compound represented by Formula 1:

$$M(C^\wedge N)(C^\wedge N)'(CN\text{—}R)X \qquad (1)$$

wherein M is a transition metal selected from the group consisting of Ru, Rh, Ir, Os, Pt, and Au;
   each (C^N) and (C^N)' is a cyclometalated ligand;
   R is aryl, aryloxy, aryloxycarbonyl, heteroaryl, arylthio, aralkyl, heteroaralkyl, or aralkenyl; and
   X is one selected from the group consisting of OCN, CN, SCN, P(Ph)$_2$, R'COO, R'CONH, R'NH, pyrazole, substituted alkyl, unsubstituted alkyl, substituted alkoxy, unsubstituted alkoxy, substituted aryloxy, unsubstituted aryloxy, NR'H, NR'$_2$, OH, SH, and a sulfonic acid group, wherein R' is an alkyl group of 1-10 carbon atoms, a cycloalkyl group of 5-14 carbon atoms, or an aryl group of 5-14 carbon atoms.

9. The organic electroluminescent device of claim 8, wherein M is Ir(III).

10. The organic electroluminescent device of claim 8, wherein the two cyclometalated ligands represented by (C^N) and (C^N)' are the same or different, and each of (C^N) and (C^N)' is independently selected from the group consisting of compounds represented by the following formulae:

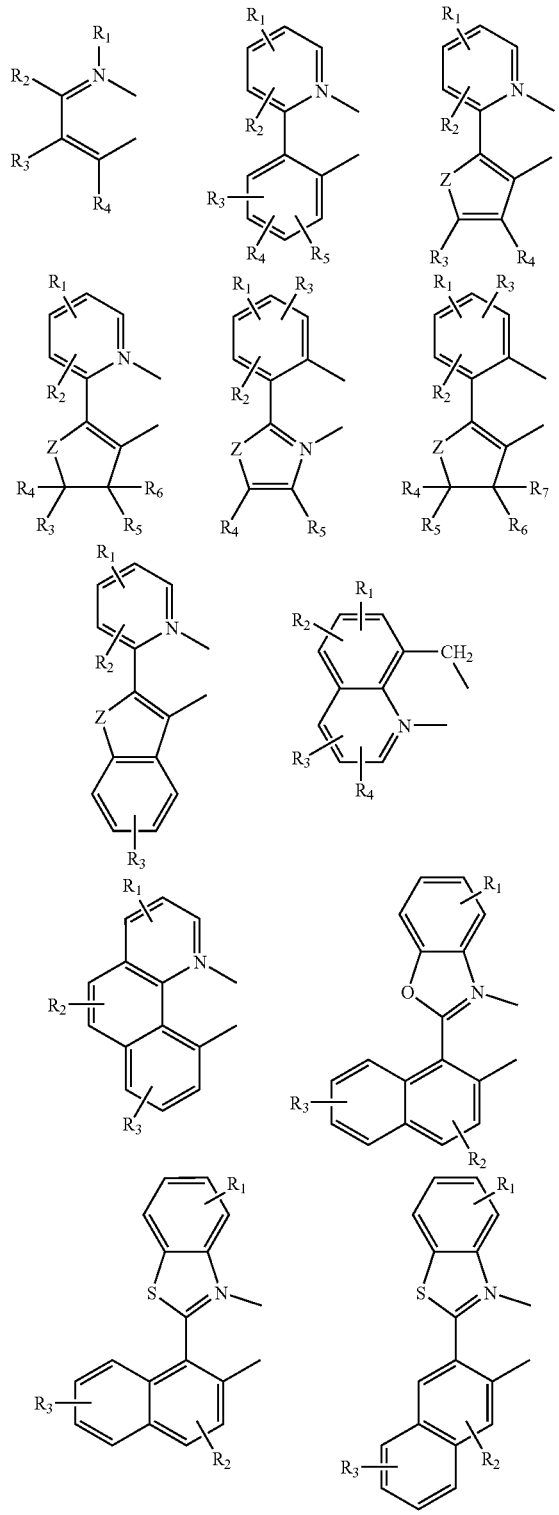

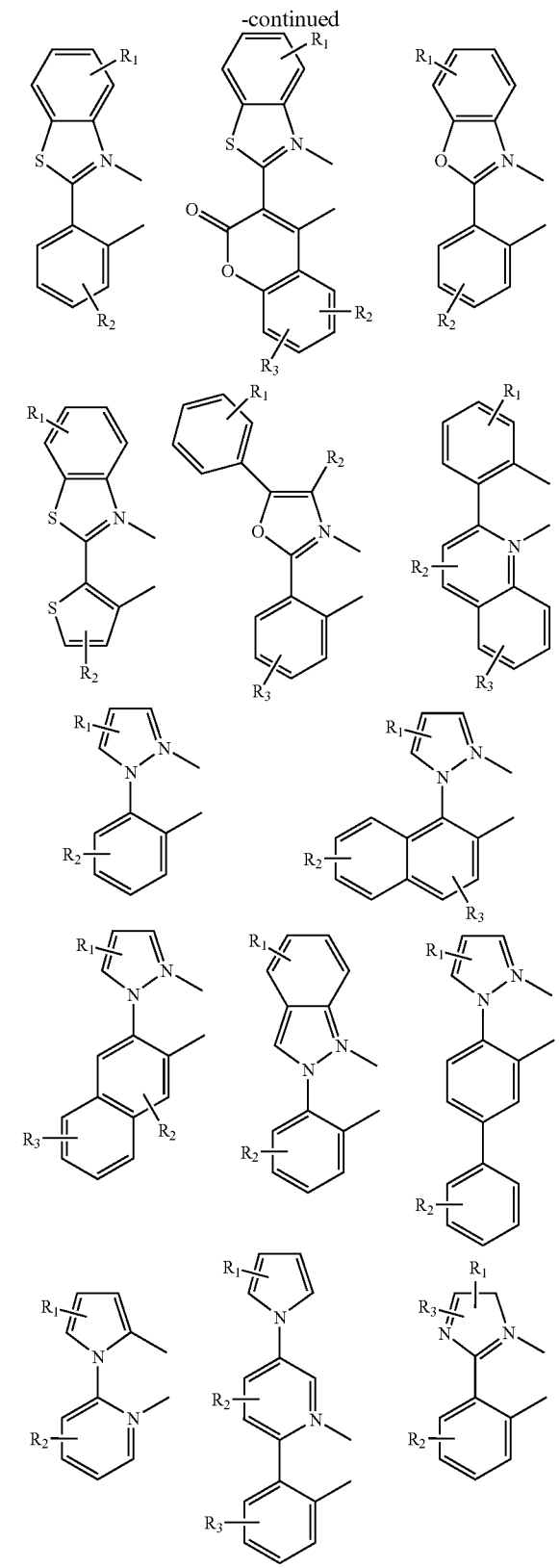

wherein Z is S, O, or NR$_1$;

R$_1$, R$_2$, R$_3$, R$_4$, R$_5$, and R$_6$ are each independently one selected from the group consisting of hydrogen, halogen, CN, alkyl, aryl, arylene, amino, alkoxy, aryloxy, heterocyclyloxy, acyl, alkoxycarbonyl, aryloxycarbonyl, acyloxy, acylamino, alkoxycarbonylamino, aryloxycarbonylamino, sulfonylamino, sulfamoyl, carbamoyl, alkylthio, arylthio, heterocyclylthio, sulfonyl, sulfinyl, ureido, phosphoramide, sulfino, hydrazino, imino, heterocyclyl, silyl, silyloxy, hydroxamine, nitro, hydroxyl, mercapto, sulfo, carboxyl, and nitro, and at least two of $R_1$, $R_2$, $R_3$, $R_4$, $R_5$, and $R_6$ can be bonded to each other.

11. The organic electroluminescent device of claim 10, wherein M is Ir(III).

12. The organic electroluminescent device of claim 8, wherein the cyclometalated transition metal complex has an emission wavelength range of 400 to 650 nm.

13. The organic electroluminescent device of claim 8, wherein the cyclometalated transition metal complex is one selected from the group consisting of compounds represented by the following formulae:

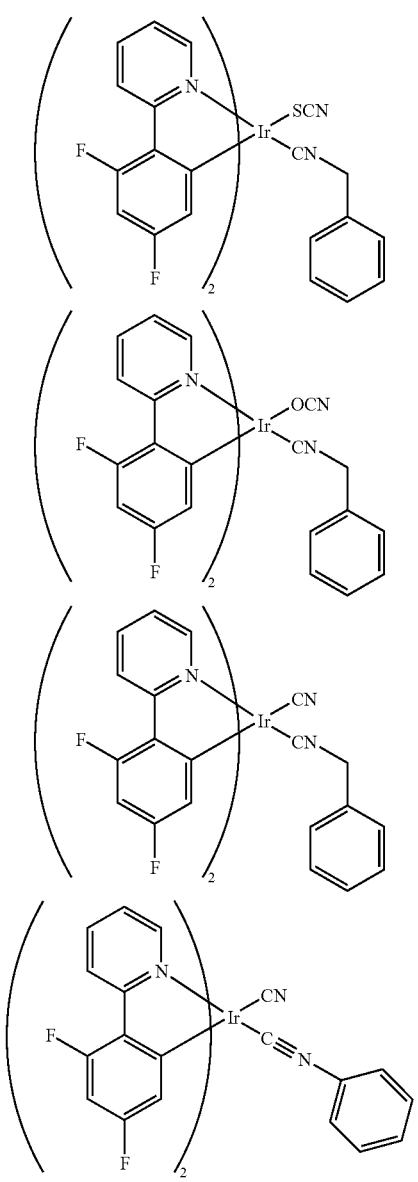

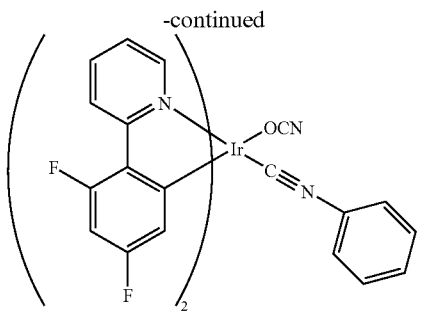

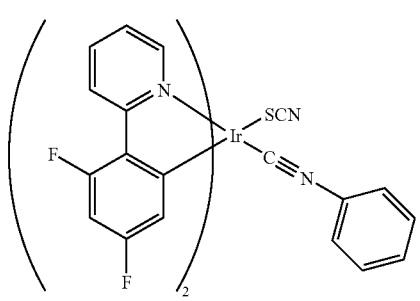

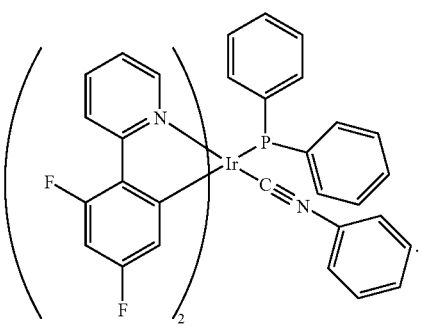

14. The organic electroluminescent device of claim 8, wherein the organic layer further comprises at least one selected from the group consisting of at least one polymeric host, a mixture of a polymeric host and a low molecular host, a low molecular host, and a non-emission polymeric matrix.

15. The organic electroluminescent device of claim 8, wherein the organic layer further comprises a green-emitting material or a red-emitting material.

16. An organic electroluminescent device, comprising:
a pair of electrodes; and
an organic layer between the pair of electrodes, the organic layer comprising a compound represented by Formula 1:

M(C^N)(C^N)'(CN—R)X   (1)

wherein M is a transition metal selected from the group consisting of Ru, Rh, Ir, Os, Pt, and Au;
(C^N) and (C^N)' are the same or different, and each of (C^N) and (C^N)' is independently selected from the group consisting of compounds represented by the following formulae:

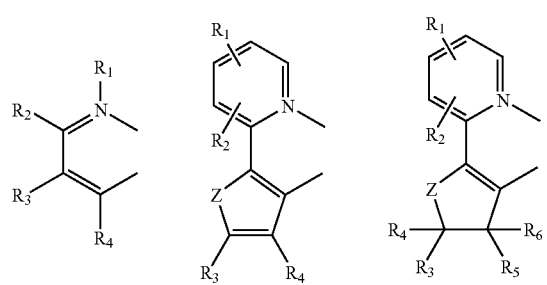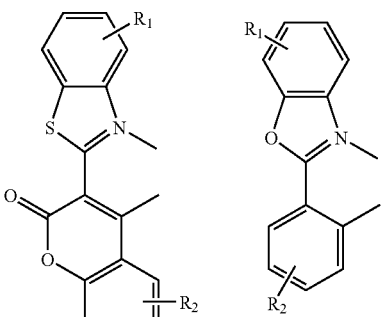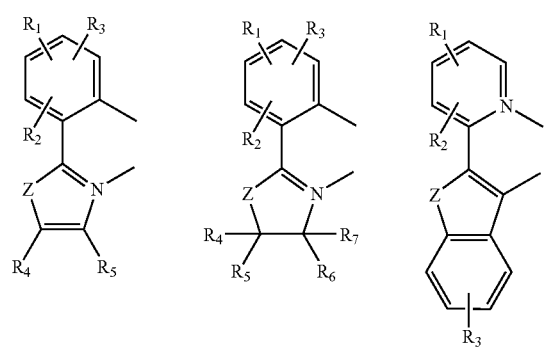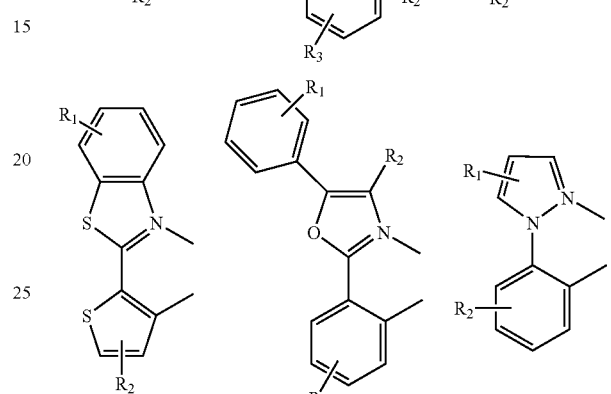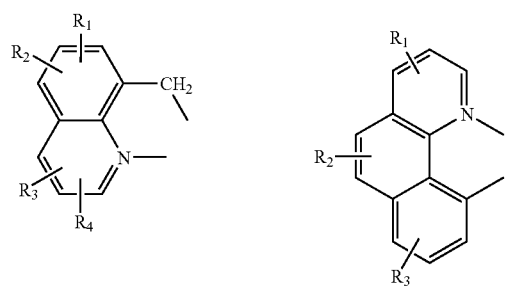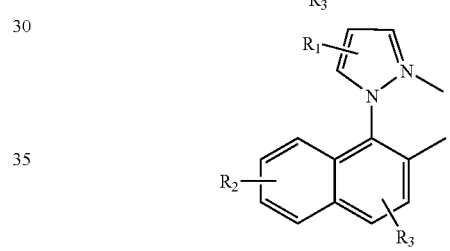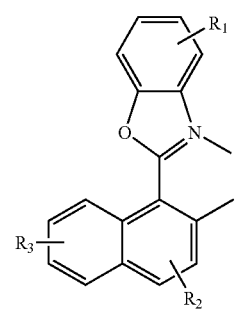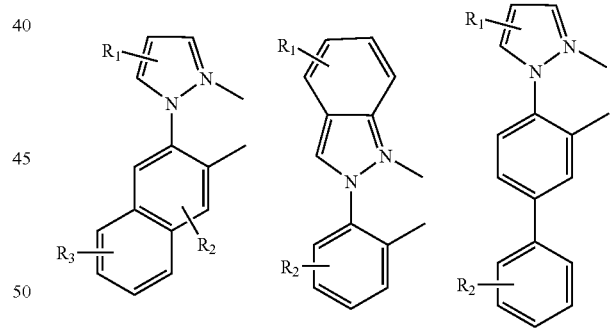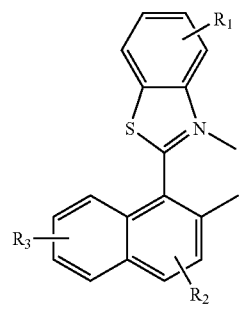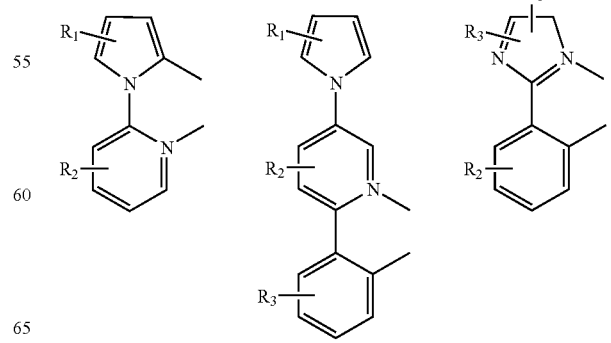

wherein Z is S, O, or NR$_1$;

R$_1$, R$_2$, R$_3$, R$_4$, R$_5$, and R$_6$ are each independently one selected from the group consisting of hydrogen, halogen, CN, alkyl, aryl, amino, alkoxy, aryloxy, heterocyclyloxy, acyl, alkoxycarbonyl, aryloxycarbonyl, acyloxy, acylamino, alkoxycarbonylamino, aryloxycarbonylamino, sulfonylamino, sulfamoyl, carbamoyl, alkylthio, arylthio, heterocyclylthio, sulfonyl, sulfinyl, ureido, phosphoramide, sulfino, hydrazino, imino, heterocyclyl, silyl, silyloxy, hydroxamine, nitro, hydroxyl, mercapto, sulfo, carboxyl, and nitro, and at least two of R1, R2, R3, R4, R5, and R6 can be bonded to each other;

R is selected from the group consisting of an aryl group of 6-30 carbon atoms, an aryloxy group of 6-30 carbon atoms, an aryloxycarbonyl group of 7-30 carbon atoms, a heteroaryl group of 4-30 carbon atoms, an arylthio group of 4-30 carbon atoms, an aralkyl group of 6-30 carbon atoms, a heteroaralkyl group of 6-30 carbon atoms, and an aralkenyl group of 7-30 carbon atoms; and X is one selected from the group consisting of Cl, OCN, CN, SCN, P(Ph)$_2$, R'COO, R'CONH, R'NH, pyrazole, substituted alkyl, unsubstituted alkyl, substituted alkoxy, unsubstituted alkoxy, substituted aryloxy, unsubstituted aryloxy, NR'H, NR'$_2$, OH, SH, and a sulfonic acid group, wherein R' is an alkyl group of 1-10 carbon atoms, a cycloalkyl group of 5-14 carbon atoms, or an aryl group of 5-14 carbon atoms.

17. The organic electroluminescent device of claim 16, wherein M is Ir(III).

18. The organic electroluminescent device of claim 16, wherein the organic layer further comprises at least one selected from the group consisting of at least one polymeric host, a mixture of a polymeric host and a low molecular host, a low molecular host, and a non-emission polymeric matrix.

* * * * *